(12) United States Patent
Kano

(10) Patent No.: US 10,802,859 B2
(45) Date of Patent: Oct. 13, 2020

(54) SETTING METHOD FOR SERVER APPARATUS AND SERVER APPARATUS FOR LOAD BALANCING

(71) Applicant: FUJITSU LIMITED, Kawasaki-shi, Kanagawa (JP)

(72) Inventor: Shinya Kano, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 15/727,821

(22) Filed: Oct. 9, 2017

(65) Prior Publication Data

US 2018/0107504 A1    Apr. 19, 2018

(30) Foreign Application Priority Data

Oct. 14, 2016 (JP) .................... 2016-203114

(51) Int. Cl.
| | | |
|---|---|---|
| *G06F 9/455* | (2018.01) | |
| *H04L 29/06* | (2006.01) | |
| *H04L 12/46* | (2006.01) | |
| *H04L 12/24* | (2006.01) | |
| *H04L 12/751* | (2013.01) | |

(52) U.S. Cl.
CPC ...... *G06F 9/45558* (2013.01); *H04L 63/0272* (2013.01); *G06F 2009/4557* (2013.01); *G06F 2009/45595* (2013.01); *H04L 12/4641* (2013.01); *H04L 41/0813* (2013.01); *H04L 45/02* (2013.01)

(58) Field of Classification Search
None
See application file for complete search history.

(56) References Cited

U.S. PATENT DOCUMENTS

| 7,793,101 B2 * | 9/2010 | Wipfel | .................... | G06F 9/468 713/168 |
|---|---|---|---|---|
| 7,852,752 B2 * | 12/2010 | Kano | .................. | H04J 14/0227 370/221 |

(Continued)

FOREIGN PATENT DOCUMENTS

| JP | 2015-154325 | 8/2015 |
|---|---|---|
| JP | 2016-046736 | 4/2016 |

(Continued)

OTHER PUBLICATIONS

Hamadi et al. "Fast Path Acceleration for Open vSwitch in Overlay Networks", 2014 IEEE, 5 pages.*

(Continued)

*Primary Examiner* — Van H Nguyen
(74) *Attorney, Agent, or Firm* — Fujitsu Patent Center

(57) ABSTRACT

A setting method for a server apparatus includes identifying, from virtual machine groups arranged in plural stages that realize communication functions, a termination type virtual machine that terminates traffics, extracting, for each of virtual machines that relay traffics to the termination type virtual machine, an auxiliary communication path including an output destination virtual machine to which a traffic addressed to the termination type virtual machine is output, and setting, for each of the virtual machines that relay traffics to the termination type virtual machine, the extracted auxiliary communication path.

5 Claims, 15 Drawing Sheets

(56) References Cited

U.S. PATENT DOCUMENTS

| | | | | |
|---|---|---|---|---|
| 8,009,677 | B2* | 8/2011 | Kano | H04L 45/04 |
| | | | | 370/230 |
| 8,990,808 | B2* | 3/2015 | Nakagawa | G06F 9/45558 |
| | | | | 709/229 |
| 9,178,715 | B2* | 11/2015 | Jain | H04L 12/4641 |
| 9,304,878 | B2* | 4/2016 | Antony | G06F 11/203 |
| 9,501,307 | B2* | 11/2016 | Borra | G06F 9/45558 |
| 9,547,517 | B2* | 1/2017 | Nayak | H04L 67/16 |
| 9,645,899 | B1* | 5/2017 | Felstaine | G06F 11/2002 |
| 9,985,877 | B2* | 5/2018 | Kramer | H04L 45/38 |
| 10,129,152 | B2* | 11/2018 | Kano | H04L 47/122 |
| 10,148,564 | B2* | 12/2018 | Wood | H04L 45/60 |
| 10,177,982 | B2* | 1/2019 | Yu | H04L 12/6418 |
| 2013/0003745 | A1 | 1/2013 | Nishimura | |
| 2013/0061225 | A1* | 3/2013 | Nakagawa | G06F 9/45558 |
| | | | | 718/1 |
| 2015/0106815 | A1* | 4/2015 | Nayak | H04L 67/16 |
| | | | | 718/1 |
| 2016/0092254 | A1* | 3/2016 | Borra | G06F 9/45558 |
| | | | | 718/1 |
| 2016/0127232 | A1 | 5/2016 | Kano | |

FOREIGN PATENT DOCUMENTS

| | | |
|---|---|---|
| JP | 2016-092530 | 5/2016 |
| WO | 2011-118585 | 9/2011 |

OTHER PUBLICATIONS

Kawashima "vNFC: A Virtual Networking Function Container for SDN-enabled Virtual Networks", 2012 IEEE, pp. 124-129.*
JPOA—Office Action of Japanese Patent Application No. 2016-203114 dated Jun. 9, 2020 with machine English translation.
**JP2016-046736 cited in the JPOA was previously submitted in the IDS filed on Oct. 9, 2017.

* cited by examiner

FIG. 7A

| | CURRENTLY-OPERATED SETTING INFORMATION BEFORE ADDITION OF FW 1E | AUXILIARY SETTING INFORMATION |
|---|---|---|
| ALLOCATION RATE OF LB 1A | • TRANSMIT, TO Proxy 1A VIA FW 1A, TWO EIGHTHS OF ENTIRE TRAFFIC AMOUNT, IN OTHER WORDS, TWO QUARTERS OF TRAFFIC AMOUNT RECEIVED BY LB 1A<br>• TRANSMIT, TO Proxy 1B VIA FW 1B, ONE EIGHTH OF ENTIRE TRAFFIC AMOUNT, IN OTHER WORDS, ONE QUARTER OF TRAFFIC AMOUNT RECEIVED BY LB 1A<br>• TRANSMIT, TO Proxy 1C VIA FW 1C, ONE EIGHTH OF ENTIRE TRAFFIC AMOUNT, IN OTHER WORDS, ONE QUARTER OF TRAFFIC AMOUNT RECEIVED BY LB 1A | |
| ALLOCATION RATE OF LB 1B | • TRANSMIT, TO Proxy 1A VIA FW 1B, ONE EIGHTH OF ENTIRE TRAFFIC AMOUNT, IN OTHER WORDS, ONE QUARTER OF TRAFFIC AMOUNT RECEIVED BY LB 1B<br>• TRANSMIT, TO Proxy 1B VIA FW 1C, ONE EIGHTH OF ENTIRE TRAFFIC AMOUNT, IN OTHER WORDS, ONE QUARTER OF TRAFFIC AMOUNT RECEIVED BY LB 1B<br>• TRANSMIT, TO Proxy 1C VIA FW 1D, TWO EIGHTHS OF ENTIRE TRAFFIC AMOUNT, IN OTHER WORDS, TWO QUARTERS OF TRAFFIC AMOUNT RECEIVED BY LB 1B | |
| TRANSFER PATH OF LB 1A | TRANSMIT, VIA FW 1A, TRAFFIC ADDRESSED TO Proxy 1A<br>TRANSMIT, VIA FW 1B, TRAFFIC ADDRESSED TO Proxy 1B<br>TRANSMIT, VIA FW 1B, TRAFFIC ADDRESSED TO Proxy 1C | ~~TRANSMIT, VIA FW 1A, TRAFFIC ADDRESSED TO Proxy 1A~~ (NOT IN USE)<br>~~TRANSMIT, VIA FW 1B, TRAFFIC ADDRESSED TO Proxy 1B~~ (NOT IN USE)<br>~~TRANSMIT, VIA FW 1B, TRAFFIC ADDRESSED TO Proxy 1C~~ (NOT IN USE) |
| TRANSFER PATH OF LB 1B | TRANSMIT, VIA FW 1B, TRAFFIC ADDRESSED TO Proxy 1A<br>TRANSMIT, VIA FW 1C, TRAFFIC ADDRESSED TO Proxy 1B<br>TRANSMIT, VIA FW 1D, TRAFFIC ADDRESSED TO Proxy 1C | ~~TRANSMIT, VIA FW 1A, TRAFFIC ADDRESSED TO Proxy 1A~~ (NOT IN USE)<br>~~TRANSMIT, VIA FW 1B, TRAFFIC ADDRESSED TO Proxy 1B~~ (NOT IN USE)<br>~~TRANSMIT, VIA FW 1C, TRAFFIC ADDRESSED TO Proxy 1C~~ (NOT IN USE) |

FIG. 7B

| | CURRENTLY-OPERATED SETTING INFORMATION BEFORE ADDITION OF FW 1E | AUXILIARY SETTING INFORMATION |
|---|---|---|
| TRANSFER PATH OF FW 1A | TRANSMIT, VIA IDS 1A, TRAFFIC ADDRESSED TO Proxy 1A | ~~TRANSMIT, VIA IDS 1A, TRAFFIC ADDRESSED TO Proxy 1A~~ (NOT IN USE)<br>~~TRANSMIT, VIA IDS 1B, TRAFFIC ADDRESSED TO Proxy 1B~~<br>~~TRANSMIT, VIA IDS 1C, TRAFFIC ADDRESSED TO Proxy 1C~~ |
| TRANSFER PATH OF FW 1B | TRANSMIT, VIA IDS 1A, TRAFFIC ADDRESSED TO Proxy 1A<br>TRANSMIT, VIA IDS 1B, TRAFFIC ADDRESSED TO Proxy 1B | ~~TRANSMIT, VIA IDS 1A, TRAFFIC ADDRESSED TO Proxy 1A~~ (NOT IN USE)<br>~~TRANSMIT, VIA IDS 1B, TRAFFIC ADDRESSED TO Proxy 1B~~ (NOT IN USE)<br>~~TRANSMIT, VIA IDS 1C, TRAFFIC ADDRESSED TO Proxy 1C~~ |
| TRANSFER PATH OF FW 1C | TRANSMIT, VIA IDS 1B, TRAFFIC ADDRESSED TO Proxy 1B<br>TRANSMIT, VIA IDS 1C, TRAFFIC ADDRESSED TO Proxy 1C | ~~TRANSMIT, VIA IDS 1A, TRAFFIC ADDRESSED TO Proxy 1A~~<br>~~TRANSMIT, VIA IDS 1B, TRAFFIC ADDRESSED TO Proxy 1B~~ (NOT IN USE)<br>~~TRANSMIT, VIA IDS 1C, TRAFFIC ADDRESSED TO Proxy 1C~~ (NOT IN USE) |
| TRANSFER PATH OF FW 1D | TRANSMIT, VIA IDS 1C, TRAFFIC ADDRESSED TO Proxy 1C | ~~TRANSMIT, VIA IDS 1A, TRAFFIC ADDRESSED TO Proxy 1A~~<br>~~TRANSMIT, VIA IDS 1B, TRAFFIC ADDRESSED TO Proxy 1B~~<br>~~TRANSMIT, VIA IDS 1C, TRAFFIC ADDRESSED TO Proxy 1C~~ (NOT IN USE) |
| TRANSFER PATH OF FW 1E | NONE | NONE |
| TRANSFER PATH OF IDS 1A | TRANSMIT, VIA Proxy 1A, TRAFFIC ADDRESSED TO Proxy 1A | ~~TRANSMIT, VIA Proxy 1A, TRAFFIC ADDRESSED TO Proxy 1A~~ (NOT IN USE)<br>~~TRANSMIT, VIA Proxy 1B, TRAFFIC ADDRESSED TO Proxy 1B~~<br>~~TRANSMIT, VIA Proxy 1C, TRAFFIC ADDRESSED TO Proxy 1C~~ |
| TRANSFER PATH OF IDS 1B | TRANSMIT, VIA Proxy 1B, TRAFFIC ADDRESSED TO Proxy 1B | ~~TRANSMIT, VIA FW 1A, TRAFFIC ADDRESSED TO Proxy 1A~~<br>~~TRANSMIT, VIA FW 1B, TRAFFIC ADDRESSED TO Proxy 1B~~ (NOT IN USE)<br>~~TRANSMIT, VIA FW 1B, TRAFFIC ADDRESSED TO Proxy 1C~~ |
| TRANSFER PATH OF IDS 1C | TRANSMIT, VIA Proxy 1C, TRAFFIC ADDRESSED TO Proxy 1C | ~~TRANSMIT, VIA FW 1A, TRAFFIC ADDRESSED TO Proxy 1A~~<br>~~TRANSMIT, VIA FW 1B, TRAFFIC ADDRESSED TO Proxy 1B~~<br>~~TRANSMIT, VIA FW 1B, TRAFFIC ADDRESSED TO Proxy 1C~~ (NOT IN USE) |

FIG. 9A

| | CURRENTLY-OPERATED SETTING INFORMATION BEFORE ADDITION OF FW 1E | AUXILIARY SETTING INFORMATION |
|---|---|---|
| ALLOCATION RATE OF LB 1A | • TRANSMIT, TO Proxy 1A VIA FW 1A, TWO TENTHS OF ENTIRE TRAFFIC AMOUNT, IN OTHER WORDS, TWO FIFTHS OF TRAFFIC AMOUNT RECEIVED BY LB 1A<br>• TRANSMIT, TO Proxy 1B VIA FW 1B, TWO TENTHS OF ENTIRE TRAFFIC AMOUNT, IN OTHER WORDS, TWO FIFTHS OF TRAFFIC AMOUNT RECEIVED BY LB 1A<br>• TRANSMIT, TO Proxy 1C VIA FW 1C, ONE TENTH OF ENTIRE TRAFFIC AMOUNT, IN OTHER WORDS, ONE FIFTH OF TRAFFIC AMOUNT RECEIVED BY LB 1A | |
| ALLOCATION RATE OF LB 1B | • TRANSMIT, TO Proxy 1A VIA FW 1C, ONE TENTH OF ENTIRE TRAFFIC AMOUNT, IN OTHER WORDS, ONE FIFTH OF TRAFFIC AMOUNT RECEIVED BY LB 1B<br>• TRANSMIT, TO Proxy 1B VIA FW 1D, TWO TENTHS OF ENTIRE TRAFFIC AMOUNT, IN OTHER WORDS, TWO FIFTHS OF TRAFFIC AMOUNT RECEIVED BY LB 1B<br>• TRANSMIT, TO Proxy 1C VIA FW 1E, TWO TENTHS OF ENTIRE TRAFFIC AMOUNT, IN OTHER WORDS, TWO FIFTHS OF TRAFFIC AMOUNT RECEIVED BY LB 1B | |
| TRANSFER PATH OF LB 1A | TRANSMIT, VIA FW 1A, TRAFFIC ADDRESSED TO Proxy 1A<br>TRANSMIT, VIA FW 1B, TRAFFIC ADDRESSED TO Proxy 1B<br>TRANSMIT, VIA FW 1B, TRAFFIC ADDRESSED TO Proxy 1C | ~~TRANSMIT, VIA FW 1A, TRAFFIC ADDRESSED TO Proxy 1A~~ (NOT IN USE)<br>~~TRANSMIT, VIA FW 1B, TRAFFIC ADDRESSED TO Proxy 1B~~ (NOT IN USE)<br>~~TRANSMIT, VIA FW 1B, TRAFFIC ADDRESSED TO Proxy 1C~~ (NOT IN USE) |
| TRANSFER PATH OF LB 1B | TRANSMIT, VIA FW 1C, TRAFFIC ADDRESSED TO Proxy 1A<br>TRANSMIT, VIA FW 1D, TRAFFIC ADDRESSED TO Proxy 1B<br>TRANSMIT, VIA FW 1E, TRAFFIC ADDRESSED TO Proxy 1C | ~~TRANSMIT, VIA FW 1C, TRAFFIC ADDRESSED TO Proxy 1A~~ (NOT IN USE)<br>~~TRANSMIT, VIA FW 1D, TRAFFIC ADDRESSED TO Proxy 1B~~ (NOT IN USE)<br>~~TRANSMIT, VIA FW 1E, TRAFFIC ADDRESSED TO Proxy 1C~~ (NOT IN USE) |

FIG. 9B

| | CURRENTLY-OPERATED SETTING INFORMATION BEFORE ADDITION OF FW 1E | AUXILIARY SETTING INFORMATION |
|---|---|---|
| TRANSFER PATH OF FW 1A | TRANSMIT, VIA IDS 1A, TRAFFIC ADDRESSED TO Proxy 1E | ~~TRANSMIT, VIA IDS 1A, TRAFFIC ADDRESSED TO Proxy 1A~~ (NOT IN USE)<br>~~TRANSMIT, VIA IDS 1B, TRAFFIC ADDRESSED TO Proxy 1B~~<br>~~TRANSMIT, VIA IDS 1C, TRAFFIC ADDRESSED TO Proxy 1C~~ |
| TRANSFER PATH OF FW 1B | TRANSMIT, VIA IDS 1B, TRAFFIC ADDRESSED TO Proxy 1A | ~~TRANSMIT, VIA IDS 1A, TRAFFIC ADDRESSED TO Proxy 1A~~<br>~~TRANSMIT, VIA IDS 1B, TRAFFIC ADDRESSED TO Proxy 1B~~ (NOT IN USE)<br>~~TRANSMIT, VIA IDS 1C, TRAFFIC ADDRESSED TO Proxy 1C~~ |
| TRANSFER PATH OF FW 1C | TRANSMIT, VIA IDS 1C, TRAFFIC ADDRESSED TO Proxy 1A<br>TRANSMIT, VIA IDS 1C, TRAFFIC ADDRESSED TO Proxy 1C | ~~TRANSMIT, VIA IDS 1A, TRAFFIC ADDRESSED TO Proxy 1A~~<br>~~TRANSMIT, VIA IDS 1B, TRAFFIC ADDRESSED TO Proxy 1B~~<br>~~TRANSMIT, VIA IDS 1C, TRAFFIC ADDRESSED TO Proxy 1C~~ (NOT IN USE) |
| TRANSFER PATH OF FW 1D | TRANSMIT, VIA IDS 1B, TRAFFIC ADDRESSED TO Proxy 1B | ~~TRANSMIT, VIA IDS 1A, TRAFFIC ADDRESSED TO Proxy 1A~~<br>~~TRANSMIT, VIA IDS 1B, TRAFFIC ADDRESSED TO Proxy 1B~~<br>~~TRANSMIT, VIA IDS 1C, TRAFFIC ADDRESSED TO Proxy 1C~~ |
| TRANSFER PATH OF FW 1E | TRANSMIT, VIA IDS 1C, TRAFFIC ADDRESSED TO Proxy 1C | ~~TRANSMIT, VIA FW 1A, TRAFFIC ADDRESSED TO Proxy 1A~~<br>~~TRANSMIT, VIA FW 1B, TRAFFIC ADDRESSED TO Proxy 1B~~<br>~~TRANSMIT, VIA FW 1B, TRAFFIC ADDRESSED TO Proxy 1C~~ |
| TRANSFER PATH OF IDS 1A | TRANSMIT, VIA Proxy 1A, TRAFFIC ADDRESSED TO Proxy 1A | ~~TRANSMIT, VIA Proxy 1A, TRAFFIC ADDRESSED TO Proxy 1A~~ (NOT IN USE)<br>~~TRANSMIT, VIA Proxy 1B, TRAFFIC ADDRESSED TO Proxy 1B~~<br>~~TRANSMIT, VIA Proxy 1C, TRAFFIC ADDRESSED TO Proxy 1C~~ |
| TRANSFER PATH OF IDS 1B | TRANSMIT, VIA Proxy 1B, TRAFFIC ADDRESSED TO Proxy 1B | ~~TRANSMIT, VIA FW 1A, TRAFFIC ADDRESSED TO Proxy 1A~~<br>~~TRANSMIT, VIA FW 1B, TRAFFIC ADDRESSED TO Proxy 1B~~ (NOT IN USE)<br>~~TRANSMIT, VIA FW 1B, TRAFFIC ADDRESSED TO Proxy 1C~~ |
| TRANSFER PATH OF IDS 1C | TRANSMIT, VIA Proxy 1C, TRAFFIC ADDRESSED TO Proxy 1C | ~~TRANSMIT, VIA FW 1A, TRAFFIC ADDRESSED TO Proxy 1A~~<br>~~TRANSMIT, VIA FW 1B, TRAFFIC ADDRESSED TO Proxy 1B~~<br>~~TRANSMIT, VIA FW 1B, TRAFFIC ADDRESSED TO Proxy 1C~~ (NOT IN USE) |

…

SETTING METHOD FOR SERVER APPARATUS AND SERVER APPARATUS FOR LOAD BALANCING

CROSS-REFERENCE TO RELATED APPLICATION

This application is based upon and claims the benefit of priority of the prior Japanese Patent Application No. 2016-203114, filed on Oct. 14, 2016, the entire contents of which are incorporated herein by reference.

FIELD

The embodiments discussed herein are related to a setting method for a server apparatus and the server apparatus.

BACKGROUND

In a recent network, there is a service chain system in which, at a time of accessing from a base to an external site or accessing from a base to another base, in response to a request, network (NW) functions such as a firewall (FW) and a proxy are virtually arranged on a communication path, thereby transferring traffics. A communication path routed through virtual NW functions is called a service chain.

In the past, physical NW devices such as NW servers have functioned as the NW functions. However, performance improvement of general-purpose servers of recent years has enabled even software processing on the general-purpose servers to realize NW functions. Accordingly, operations of NW functions have been started in forms in which programs of NW functions have been operated on virtual machines in a virtualization environment of general-purpose servers. Note that software processing related to a NW operating on a virtual machine is called a virtual network function (virtual NW function (VNF)).

However, an operation form of NW-related processing such as data transfer shifts from a physical NW device to a VNF of software processing on a general-purpose server, thereby causing, as a result, a situation that processing performance of data transfer is reduced. Therefore, programs are executed in parallel, and virtual machines operate in parallel on servers, thereby distributing a load of data transfer and improving processing performance of the data transfer.

FIG. 13 is an explanatory diagram illustrating an example of an arrangement configuration of a service chain. In a service chain 200 illustrated in FIG. 13, individual VNFs 201 such as FWs 201A, intrusive detection systems (IDSs) 201B, and proxies 201C are arranged, for example. Furthermore, in the service chain 200, a load balancer (LB) 202 to distribute a traffic is virtually arranged in a preceding stage of each of the VNFs 201. The LBs 202 distribute traffics to the individual VNFs 201 arranged in subsequent stages. As a result, a load of transfer processing of each of the VNFs 201 is distributed, thereby suppressing a decrease in processing performance, caused by being subjected to software processing.

Techniques of the related art are disclosed in Japanese Laid-open Patent Publication No. 2015-154325, Japanese Laid-open Patent Publication No. 2016-46736, International Publication Pamphlet No. WO 2011/118585, and Japanese Laid-open Patent Publication No. 2016-92530.

SUMMARY

According to an aspect of the invention, a setting method for a server apparatus includes identifying, from virtual machine groups arranged in plural stages that realize communication functions, a termination type virtual machine that terminates traffics, extracting, for each of virtual machines that relay traffics to the termination type virtual machine, an auxiliary communication path including an output destination virtual machine to which a traffic addressed to the termination type virtual machine is output, and setting, for each of the virtual machines that relay traffics to the termination type virtual machine, the extracted auxiliary communication path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 7A and 7B are explanatory diagrams illustrating examples of currently-operated setting information and auxiliary setting information before addition of a FW;

FIGS. 9A and 9B are explanatory diagrams illustrating examples of the currently-operated setting information and the auxiliary setting information after the addition of the FW;

DESCRIPTION OF EMBODIMENTS

In the service chain 200, in a case where a setting change such as scale-out or scale-in occurs, the scale-out including addition of the VNFs 201 in response to a change in loads of the VNFs 201, the scale-in including deletion of the VNFs 201, a time difference between the individual VNFs 201 occurs before setting changes of the individual VNFs 201 are completed. As a result, the time difference before the completion of the setting changes causes traffic discarding in the VNFs 201.

In one aspect, an object is to provide a setting method and a server apparatus each able to avoid traffic discarding caused by a time difference before completion of setting changes of a service chain.

Hereinafter, embodiments of a setting method and a server apparatus disclosed in the present application will be described in detail based on drawings. Note that the disclosed technology is not limited by the present embodiments. In addition, the embodiments illustrated below may be arbitrarily combined to the extent that there are no inconsistencies.

Figure 1:
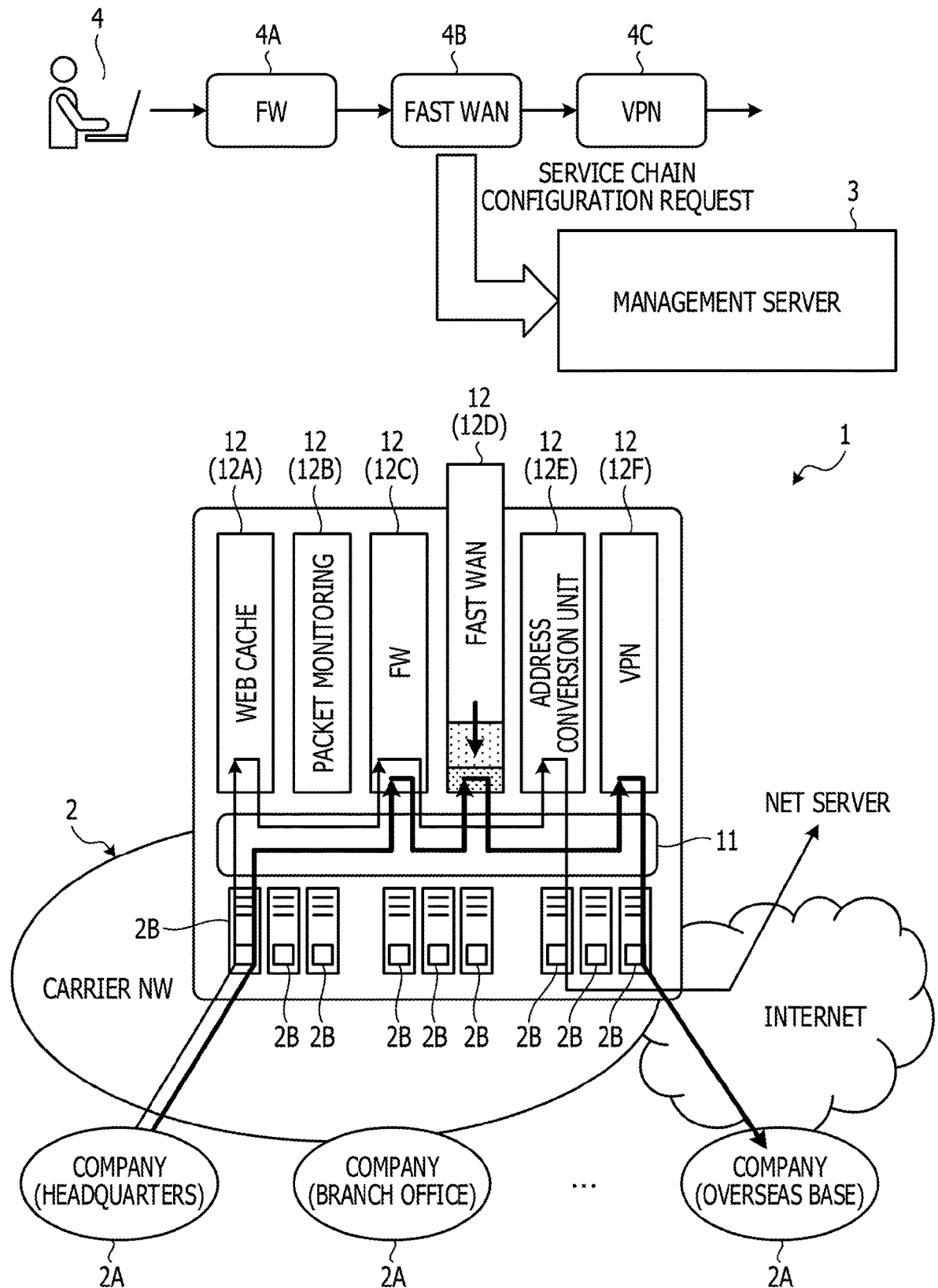
FIG. 1 is an explanatory diagram illustrating an example of a service chain system.

FIG. 1 is an explanatory diagram illustrating an example of a service chain system 1. The service chain system 1 illustrated in FIG. 1 includes a carrier NW 2, a management server 3, and a terminal device 4. The carrier NW 2 is a NW coupled to bases 2A such as the headquarters of a company, a branch office thereof, and an overseas base thereof, for example. The carrier NW 2 is configured by, for example, general-purpose servers 2B and includes a virtual NW 11 that operates in virtual areas located in resource areas of the individual general-purpose servers 2B, and VNFs 12 arranged on that virtual NW 11. The management server 3 establishes, in the virtual areas, a service chain that communicates between the bases 2A.

The VNFs 12 are virtual NW functions such as a web cache 12A, a packet monitoring 12B, a FW 12C, a fast WAN 12D, an address conversion unit 12E, a VPN 12F, an IDS, and a proxy, for example. The web cache 12A is a NW function of storing cache data with a web server not illustrated. The packet monitoring 12B is a NW function of monitoring states of packets on a communication path. The FW 12C is a NW function of avoiding unauthorized accesses. The fast WAN 12D is a NW function such as a fast WAN. The address conversion unit 12E is a NW function of converting addresses. The VPN 12F is a NW function such as a virtual private line. The IDS is a NW function of sensing unauthorized invasions from outside. The proxy is a NW function of a proxy server. The VNFs 12 are virtual machines for realizing communication functions virtually arranged in the virtual areas on the general-purpose servers 2B.

The management server 3 is a server apparatus that arranges, in response to a configuration request for a service chain from the terminal device 4, the desired virtual NW 11 and VNFs 12 on the virtual areas of the individual general-purpose servers 2B within the carrier NW 2. The terminal device 4 is a terminal device that is used by, for example, a system administrator or the like, that is coupled to the management server 3 via a FW 4A, a fast WAN 4B, a VPN 4C, and so forth, and that issues, to the management server 3, an instruction for a configuration request for a service chain, for example. Note that the configuration request is a command that requests to arrange one or more VNFs 12 on a communication path of traffic transfer. In addition, in addition to a case of specifying the number of instances of the VNFs 12 and the number of instances of LBs 13, the configuration request only specifies the number of instances of the VNFs 12 in some cases. In addition, the configuration request specifies, for example, a desired quality of the service chain in some cases. Upon detecting the configuration request that specifies the desired quality, the management server 3 determines the number of instances of the VNFs 12 and the number of instances of the LBs 13, based on desired functions specified by the configuration request and a load state. Each of the LBs 13 is a distribution type virtual machine for realizing a distribution function for a load.

Figure 2:
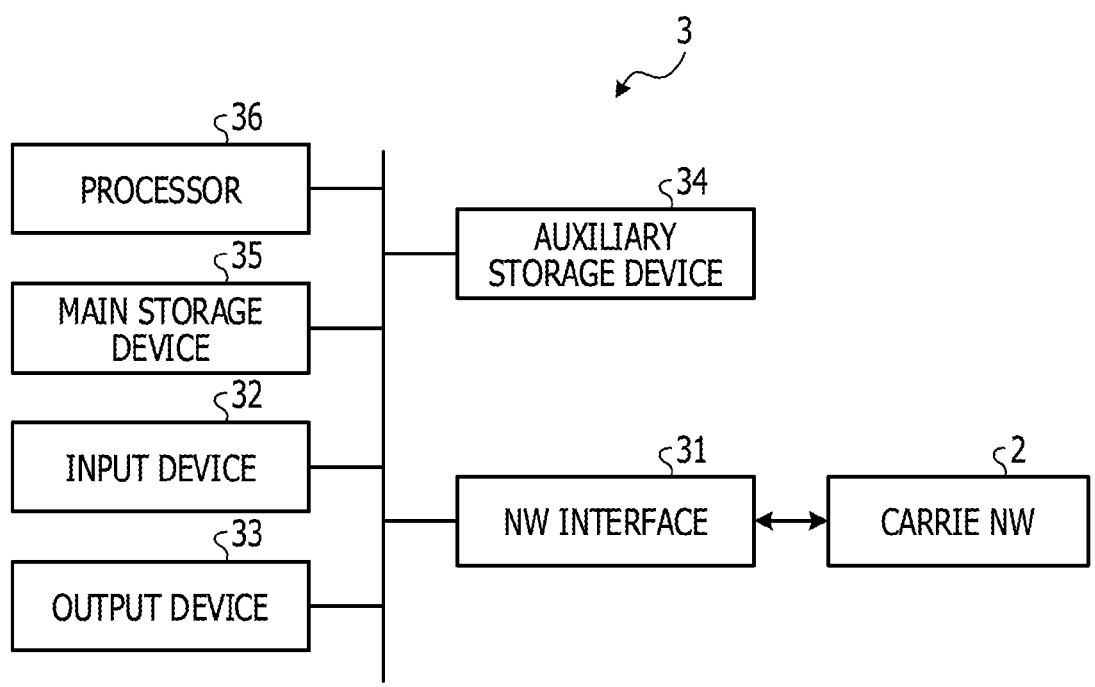
FIG. 2 is an explanatory diagram illustrating an example of a hardware configuration of a management server.

FIG. 2 is an explanatory diagram illustrating an example of a hardware configuration of the management server 3. The management server 3 illustrated in FIG. 2 is equivalent to a dedicated computer serving as a NW server or a general-purpose computer, for example. The management server 3 includes a NW interface 31, an input device 32, an output device 33, an auxiliary storage device 34, a main storage device 35, and a processor 36. The NW interface 31 is a communication interface that is coupled to the carrier NW 2 and that is coupled to the VNFs 12. Note that the NW interface 31 is a communication interface that manages wired or wireless communication, for example. The NW interface 31 is a communication card such as, for example, a network interface card (NIC) or a local area network (LAN) card.

The input device 32 is an input interface such as, for example, a keyboard or a pointing device, which inputs various kinds of information, examples of the pointing device including a mouse. The output device 33 is an output interface such as, for example, a sound-output device or a display device, which outputs various kinds of information. The auxiliary storage device 34 is a non-volatile memory such as, for example, an erasable programmable rom (EPROM) or a hard disc drive, which stores therein various programs and various kinds of information such as, for example, data used by the processor 36. Furthermore, the auxiliary storage device 34 is an area that holds an operating system (OS) and other various application programs, for example.

The main storage device 35 is a semiconductor memory such as, for example, a random access memory (RAM), which provides areas to store therein various kinds of information such as, for example, programs stored in the auxiliary storage device 34 and a working area. The processor 36 is a control unit such as, for example, a central processing unit (CPU), which controls the entire management server 3. The processor 36 loads, into the main storage device 35, and executes the OS and various application programs, held by the auxiliary storage device 34 or a portable recording medium, thereby performing various processing functions. The processor 36 is not limited to one processor, and the processors 36 may be provided.

Figure 3:
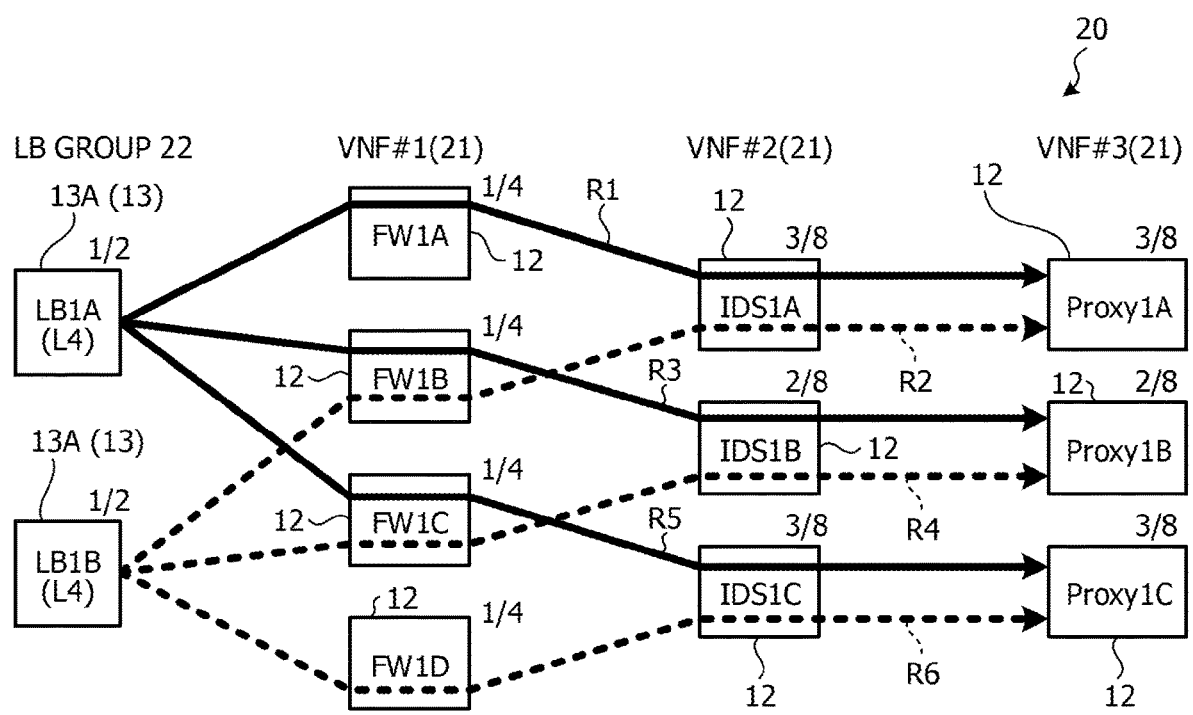
FIG. 3 is an explanatory diagram illustrating an example of an arrangement configuration of a service chain.

FIG. 3 is an explanatory diagram illustrating an example of an arrangement configuration of a service chain 20. The service chain 20 illustrated in FIG. 3 includes VNF groups 21 and an LB group 22. As for the VNF groups 21, a VNF #1, a VNF #2, and a VNF #3 are arranged in a predetermined sequence. The VNF #1 includes a FW 1A to a FW 1D, for example. The VNF #2 includes an IDS 1A to an IDS 1C, for example. The VNF #3 includes a proxy 1A to a proxy 1C, for example. The LB group 22 includes an LB 1A and an LB 1B, for example.

Upon detecting the configuration request, the processor 36 determines, based on the number of instances of the VNFs 12 within each of the VNF groups 21, specified within the configuration request, the number of aggregation LBs 13A to be arranged in a preceding stage of the VNF group 21 located in a first stage in the predetermined sequence, in other words, the VNF #1. Note that it is assumed that, as for the predetermined sequence, starting from a preceding stage, the VNF #1 (FWs), the VNF #2 (IDSs), and the VNF #3 (proxies) are arranged in this order, for example.

Upon detecting the configuration request, the processor 36 identifies, based on the configuration request, the LB group 22 (LBs 13 (L4) for the VNF #3) in an upper layer of an "L4 level", as for characteristics of the LBs 13 that distribute traffics to the VNF groups 21. Note that distribution processing in units of the L4 level (a TCP session) is able to perform distribution processing in units of an L3 level (an IP). The processor 36 identifies, among the LB group 22 to perform the distribution processing of the upper layer of the "L4 level", the LBs 13 having the maximum number of instances of LBs, and the processor 36 determines the number of instances of LBs as the number of instances of the aggregation LBs 13A. In a case where the number of instances of LBs of the VNF #3 is two LBs of the L4 level, the processor 36 determines the two LBs of the L4 level, as the number of the aggregation LBs 13A, for example. Note that the reason why the VNF group 21 of the L4 level is identified is that distribution processing in units of the L4 level (a TCP session) is able to perform distribution processing in units of the L3 level (an IP).

Furthermore, the processor 36 determines a topology configuration as an arrangement sequence of the VNF #1, the VNF #2, and the VNF #3. As illustrated in FIG. 3, the processor 36 determines a topology configuration in which the VNF #1 is arranged in the first stage of the service chain 20, the VNF #2 is arranged in a stage subsequent to the VNF #1, the VNF #3 is arranged in a stage subsequent to the VNF #2, and the aggregation LBs 13A are further arranged in a stage preceding the VNF #1 in the first stage. Note that the topology configuration has a configuration in which the LB 1A and the LB 1B included in the aggregation LBs 13A are arranged in a first stage, the FW 1A to the FW 1D included in the VNF #1 are arranged in a subsequent stage, the IDS 1A to the IDS 1C included in the VNF #2 are arranged in a stage subsequent thereto, and the proxy 1A to the proxy 1C included in the VNF #3 are arranged in a stage subsequent thereto.

The processor 36 determines allocation rates of the traffic amounts of the aggregation LBs 13A and traffic rates of the VNFs 12 with which traffics from the aggregation LBs 13A to the individual VNFs 12 within the terminatory VNF group 21 included in the VNF groups 21 are distributed. The processor 36 determines the VNFs 12 within the terminatory VNF group 21 included in the VNF groups 21 and determines optimum paths from the aggregation LBs 13A to the individual terminatory VNFs 12.

The aggregation LBs 13A are LBs of the L4 level. Therefore, the processor 36 determines, for example, the proxy 1A to the proxy 1C of the VNF #3, as the terminatory VNF group 21 at which the L4 level from the aggregation LBs 13A is terminated. "LB 1A" of the aggregation LBs 13A determines three paths of the proxy 1A to the proxy 1C. Furthermore, "LB 1B" of the aggregation LBs 13A determines three paths of the proxy 1A to the proxy 1C. "LB 1A" and "LB 1B" of the aggregation LBs 13A are termination type LBs each able to distribute traffics by the number of the terminatory VNFs 12. Since the terminatory VNF group 21 has the proxy 1A to the proxy 1C the number of which is three, the LB 1A is able to distribute traffics to three paths, for example.

In the three paths from "LB 1A" of the aggregation LBs 13A to the terminatory VNFs 12, in other words, to the proxy 1A to the proxy 1C, the processor 36 performs minimum path calculation while increasing link costs on paths already calculated in a minimum path cost method such as, for example, the Dijkstra's algorithm. In the minimum path calculation of the three paths from the LB 1A to the terminatory VNFs 12, the processor 36 determines optimum paths R1, R3, and R5 in which paths routed through the VNF #1 and the VNF #2 are distributed. In the three paths from "LB 1B" of the aggregation LBs 13A to the terminatory VNFs 12, in other words, to the proxy 1A to the proxy 1C, the processor 36 uses the minimum path cost method and performs link cost addition. In addition, based on that calculation, the processor 36 determines optimum paths R2, R4, and R6 in which paths routed through the VNF #1 and the VNF #2 are distributed.

The processor 36 determines allocation rates of traffic amounts to the respective VNFs 12 in the first stage from the aggregation LBs 13A so that, within the VNF groups 21 arranged in the individual optimum paths R1 to R6, traffic amounts of the respective VNFs 12 included in the VNF group 21 having the maximum number of instances of the VNFs 12 are evenly distributed. From among the VNF #1 to the VNF #3, the processor 36 identifies the maximum number of the VNFs 12, in other words, the VNF #1 (the FW 1A to the FW 1D). Within the six optimum paths, the processor 36 calculates allocation rates for allocating from "LB 1A" and "LB 1B" of the aggregation LBs 13A to the FW 1A to the FW 1D within the VNF #1 so that traffic amounts of the FW 1A to the FW 1D in the VNF #1 become even. In a case where it is assumed that the traffic amount of the entire service chain 20 is "1", an allocation rate from the LB 1A to the FW 1A is one quarter of the entire traffic amount, an allocation rate from the LB 1A to the FW 1B is one eighth of the entire traffic amount, and an allocation rate from the LB 1A to the FW 1C is one eighth of the entire traffic amount. Furthermore, an allocation rate from the LB 1B to the FW 1D is one quarter of the entire traffic amount, an allocation rate from the LB 1B to the FW 1B is one eighth of the entire traffic amount, and an allocation rate from the LB 1B to the FW 1C is one eighth of the entire traffic amount. As a result, one quarter of the entire traffic amount turns out to be evenly allocated to each of the FW 1A to the FW 1D.

For each of the optimum paths, the processor 36 calculate traffic rates from each of the VNFs 12 to the VNFs 12 in a subsequent stage so that traffic rates of traffic amounts to the individual VNFs 12 become optimized. After determining allocation rates of traffic amounts from the LB 1A and the LB 1B of the aggregation LBs 13A to the individual FW 1A to FW 1D included in the VNF #1, the processor 36 determines transfer paths on the optimum paths R1 to R6 previously determined. Furthermore, the processor 36 determines allocation rates to the respective VNFs 12 on the transfer paths. The transfer paths are paths via which the VNFs 12 transfer traffics to the VNFs 12 in subsequent stages and that are included in the optimum paths.

Transfer paths of the LB 1A of the aggregation LBs 13A are a path via which a traffic addressed to the proxy 1A is transferred to the FW 1A, a path via which a traffic addressed to the proxy 1B is transferred to the FW 1B, and a path via which a traffic addressed to the proxy 1C is transferred to the FW 1C. Transfer paths of the LB 1B of the aggregation LBs 13A are a path via which a traffic addressed to the proxy 1A is transferred to the FW 1B, a path via which a traffic addressed to the proxy 1B is transferred to the FW 1C, and a path via which a traffic addressed to the proxy 1C is transferred to the FW 1D.

Furthermore, a transfer path of the FW 1A is a path via which a traffic addressed to the proxy 1A is transferred to the IDS 1A. Transfer paths of the FW 1B are a path via which a traffic addressed to the proxy 1A is transferred to the IDS 1A and a path via which a traffic addressed to the proxy 1B is transferred to the IDS 1B. Transfer paths of the FW 1C are a path via which a traffic addressed to the proxy 1B is transferred to the IDS 1B and a path via which a traffic addressed to the proxy 1C is transferred to the IDS 1C. A transfer path of the FW 1D is a path via which a traffic addressed to the proxy 1C is transferred to the IDS 1C.

Furthermore, a transfer path of the IDS 1A is a path via which a traffic addressed to the proxy 1A is transferred to the proxy 1A. A transfer path of the IDS 1B is a path via which a traffic addressed to the proxy 1B is transferred to the proxy 1B. A transfer path of the IDS 1C is a path via which a traffic addressed to the proxy 1C is transferred to the proxy 1C. Furthermore, the processor determines the traffic rates of the respective VNFs 12 so that the traffic amounts of the respective VNFs 12 in each of the transfer paths become optimized. Note that the traffic rate of each of the VNFs 12 is calculated by using, for example, a weighted Round Robin method, a weighted hash sorting method, or the like.

The processor 36 determines a traffic rate for each of transfer paths from the VNF #1 to the VNF #2. A traffic rate of a transfer path from the FW 1A to the IDS 1A is two eighths of the entire traffic amount, a traffic rate of a transfer path from the FW 1B to the IDS 1A is one eighth of the entire traffic amount, and a traffic rate of a transfer path from the FW 1B to the IDS 1B is one eighth of the entire traffic amount. A traffic rate of a transfer path from the FW 1C to the IDS 1B is one eighth of the entire traffic amount, a traffic rate of a transfer path from the FW 1C to the IDS 1C is one eighth of the entire traffic amount, and a traffic rate of a transfer path from the FW 1D to the IDS 1C is two eighths of the entire traffic amount.

Furthermore, the processor 36 determines a traffic rate for each of transfer paths from the VNF #2 to the VNF #3. A traffic rate of a transfer path from the IDS 1A to the proxy 1A is three eighths, a traffic rate of a transfer path from the IDS 1B to the proxy 1B is three eighths, and a traffic rate of a transfer path from the IDS 1C to the proxy 1C is three eighths, for example. Note that while, for convenience of explanation, the traffic rates of the respective transfer paths from the VNF #2 to the VNF #3 are three eighths, two eighths, and three eighths, for example, traffic rates may be adjusted so as to be even for the individual transfer paths.

Based on the number of the aggregation LBs 13A and the VNFs 12, the optimum paths R1 to R6, and the transfer paths, the processor 36 arranges the aggregation LBs 13A and the VNFs 12 in virtual areas of the general-purpose servers 2B and so forth, thereby activating functions. The processor 36 sets determined allocation rates of the aggregation LBs 13A in the arranged aggregation LBs 13A. The processor 36 sets determined traffic rates of the individual VNFs 12 in the arranged VNFs 12. As a result, it is possible to construct the service chain 20 of the configuration request under a virtual environment.

Based on the aggregation LBs 13A, the optimum paths from the aggregation LBs 13A to the terminated VNFs 12, the allocation rates of the aggregation LBs 13A, and the traffic rates of the respective VNFs 12, the management server 3 constructs the service chain 20 of the configuration request in specified virtual areas of the general-purpose servers 2B on the carrier NW 2.

Figure 4:
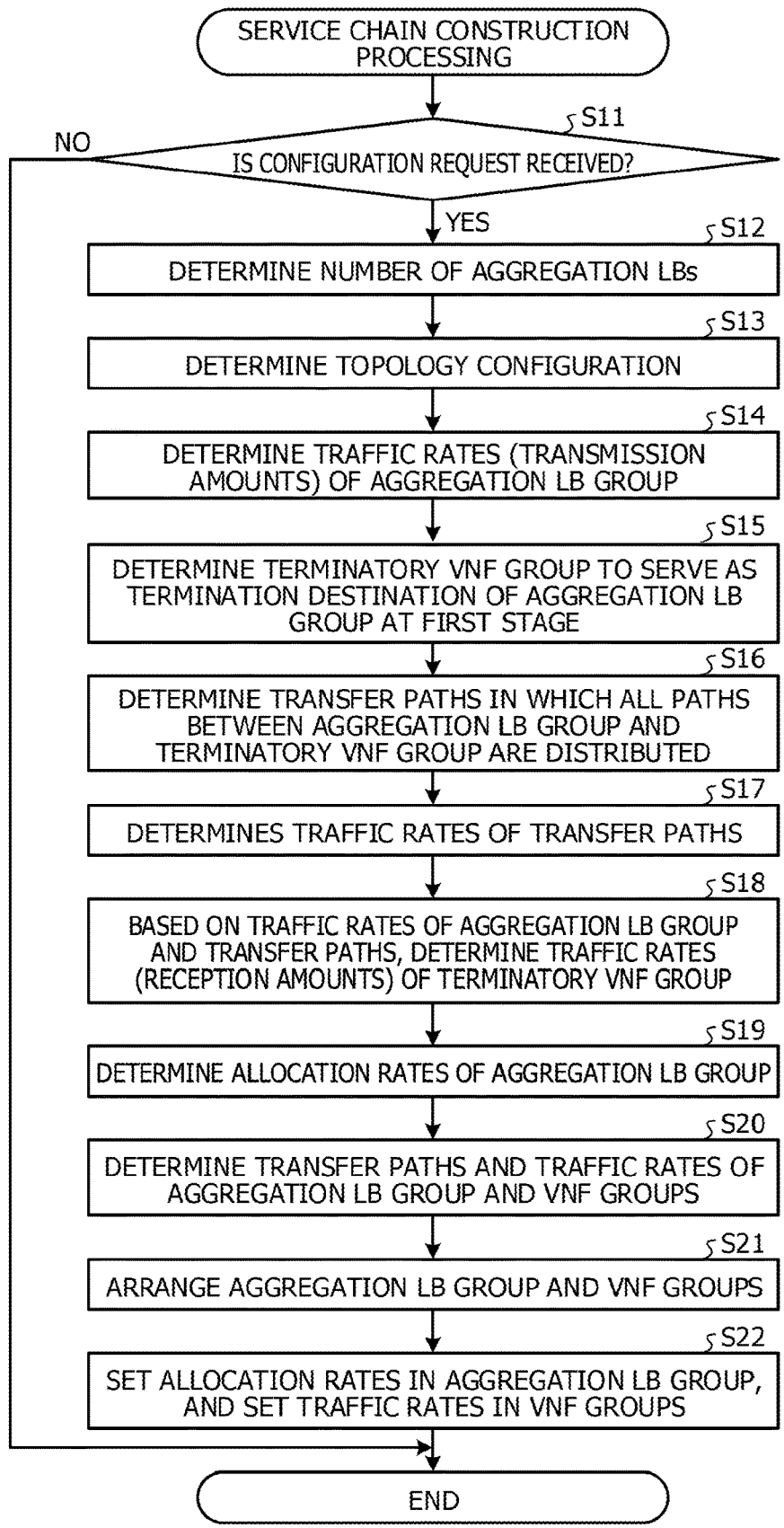
FIG. 4 is a flowchart illustrating an example of a processing operation of a the management server related to service chain construction processing.

Next, the service chain system 1 will be described. FIG. 4 is a flowchart illustrating an example of a processing operation of the management server 3 related to service chain construction processing. In FIG. 4, the processor 36 in the management server 3 determines whether or not a configuration request is received from the terminal device 4 (step S11). In a case where the configuration request is received (step S11: affirmative), the processor 36 determines the number of the aggregation LBs 13A, based on the number of instances of the VNFs 12 within the VNF groups 21 and the number of instances of the LBs 13 for each of the VNF groups 21, included in the configuration request (step S12). Note that the processor 36 identifies, among the VNF groups 21 at an upper level within the configuration request, one of the VNF groups 21, which has the maximum number of instances of the VNFs 12, for example, and that the processor 36 determines, as the number of the aggregation LBs 13A, the number of instances of LBs of the identified VNF group 21. Furthermore, based on the VNF groups 21 within the configuration request, the processor 36 determines, as illustrated in FIG. 3, a topology configuration of the aggregation LB group 22 of the aggregation LBs 13A and the VNF groups 21 (step S13).

The processor 36 determines traffic rates (transmission amounts) of the aggregation LB group 22 at the first stage in the service chain 20 (step S14). Note that, as illustrated in FIG. 3, as for the traffic rates (the transmission amounts) of the aggregation LB group 22, the LB 1A turns out to transmit one half of the entire traffic amount and the LB 1B turns out to transmit one half of the entire traffic amount. The processor 36 identifies the terminatory VNF group 21 to serve as a termination destination of the aggregation LB group 22 at the first stage (step S15). Note that the terminatory VNF group 21 is equivalent to the VNF #3 illustrated in, for example, FIG. 3 and the terminatory VNFs 12 are the proxy 1A to the proxy 1C.

The processor 36 determines transfer paths in which all paths between the aggregation LB group 22 and the terminatory VNF group 21 are distributed (step S16). Note that, as illustrated in FIG. 3, all the paths are a transfer path between the LB 1A and the proxy 1A, a transfer path between the LB 1A and the proxy 1B, a transfer path between the LB 1A and the proxy 1C, a transfer path between the LB 1B and the proxy 1A, a transfer path between the LB 1B and the proxy 1B, and a transfer path between the LB 1B and the proxy 1C. The processor 36 determines traffic rates of the respective transfer paths (step S17).

Based on the traffic rates of the aggregation LB group 22 and the transfer paths, the processor 36 determines traffic rates (reception amounts) of the respective VNFs 12 within the terminatory VNF group 21 (step S18). Note that since the terminatory VNF group 21 is the VNF #3, the proxy 1A turns out to receive three eighths of the entire traffic amount, the proxy 1B turns out to receive two eighths of the entire traffic amount, and the proxy 1C turns out to receive three eighths of the entire traffic amount.

In addition, the processor 36 determines allocation rates of the aggregation LB group 22 (step S19). Furthermore, after determining transfer paths and traffic rates of the aggregation LB group 22 and the VNF groups 21 (step S20), the processor 36 arranges the aggregation LB group 22 and the VNF groups 21 in virtual areas on the general-purpose servers 2B, thereby activating functions thereof (step S21). Furthermore, the processor 36 sets the allocation rates of the aggregation LB group 22 in the aggregation LBs 13A on virtual areas and sets the traffic rates of the VNF groups 21 in the individual VNFs 12 on virtual areas (step S22), thereby terminating the processing operation illustrated in FIG. 4. As a result, it is possible to arrange, on the virtual areas, the service chain 20 appropriate to the configuration request. In a case where no configuration request is received (step S11: negative), the processor 36 terminates the processing operation illustrated in FIG. 4.

In the above-mentioned example, the aggregation LBs 13A are arranged in the first stage of the service chain 20, and the allocation rates of the aggregation LB group 22 and the traffic rates of the respective VNFs 12 are determined so that traffic amounts from the aggregation LBs 13A to the terminatory VNF group 21 become even. As a result, by reducing the number of the LBs 13, it is possible to suppress a transfer delay and to reduce finite resources of the virtual areas.

However, even in a case where scale-out for adding the VNFs 12 within the service chain 20 or scale-in for deleting the VNFs 12 occurs, it is desirable to change the allocation rates of the aggregation LB group 22 arranged in a stage preceding the VNFs 12, the traffic rates and the transfer paths of the individual VNFs 12. In a case where a FW 1E is added to the VNF #1 within the service chain 20 illustrated in, for example, FIG. 3, it is desirable to change the allocation rates of the LB 1A and the LB 1B, transfer paths of the FW 1C to the FW 1E, and so forth. It is assumed that the FW 1D performs processing such as, for example, a log output, it is difficult to simultaneously change settings, and a change in a setting of the FW 1D is delayed and is preceded by a change in a setting of the LB 1B. At this time, even in a case where a traffic allocated by the LB 1B and addressed to the proxy 1B arrives at the FW 1D, a transfer path of a traffic addressed to the Proxy 2B is not registered in the FW 1D. Therefore, that traffic turns out to be discarded. As a result, since it is difficult to synchronize changes in settings of the VNFs 12 with one another, a time difference occurs before all the changes in settings are completed. Accordingly, communication disconnection caused by traffic discarding occurs in each of the VNFs 12. In addition, it is conceivable that, in order to avoid traffic discarding caused by a time difference between completions of changes in settings, paths are changed based on the Make Before Break method of sequentially changing settings of paths one by one. However, if a path configuration within a service chain becomes complex, it takes a good amount of time to complete changes in settings of all paths.

Therefore, in order to deal with such a state, there will be described an embodiment of the service chain system 1 capable of dealing with scale-out and scale-in while suppressing communication disconnection in a case where the scale-out and the scale-in occur within the service chain 20. Note that the same symbol is assigned to the same configuration as that of the service chain system 1 of the above-mentioned example, thereby omitting descriptions of a redundant configuration and an operation thereof.

EMBODIMENTS

Figure 5:
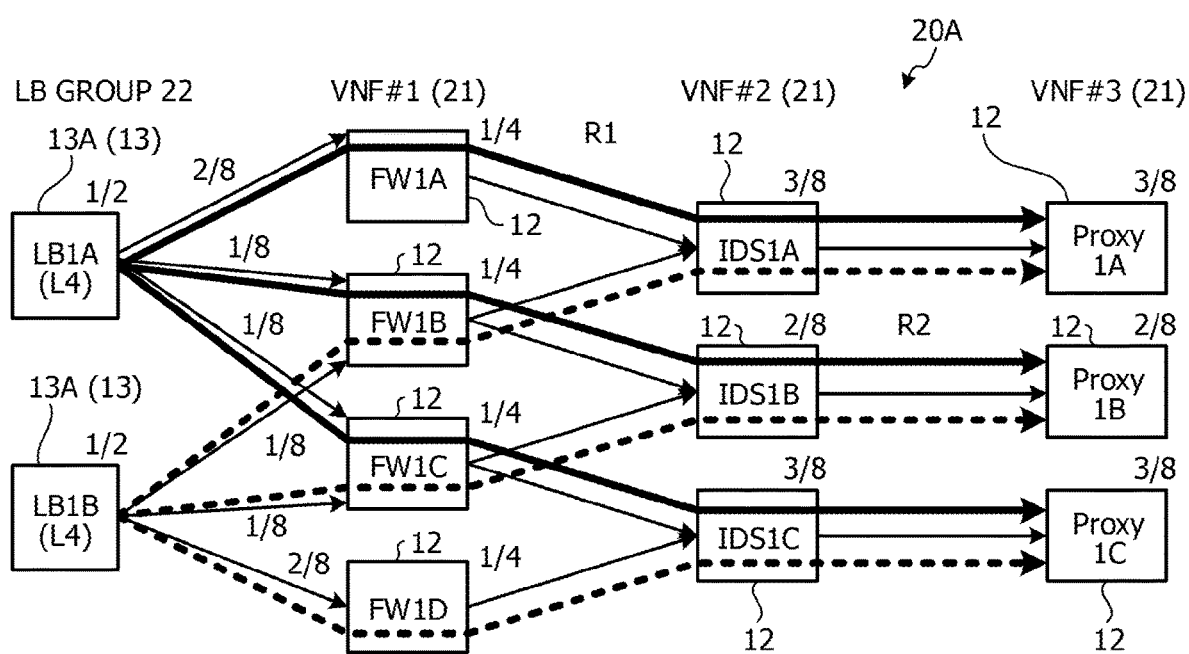
FIG. 5 is an explanatory diagram illustrating an example of an arrangement configuration of a service chain of the present embodiment.

FIG. 5 is an explanatory diagram illustrating an example of an arrangement configuration of a service chain 20A of the present embodiment. The service chain 20A illustrated in FIG. 5 includes VNF groups 21 of the VNF #1 to the VNF #3 and the aggregation LB group 22 arranged in a preceding stage of the VNF #1 located in a first stage within the VNF groups 21. The VNF #1 includes the FW 1A to the FW 1D, for example. The VNF #2 includes the IDS 1A to the IDS 1C, for example. The VNF #3 includes the proxy 1A to the proxy 1C, for example. Note that the VNF #3 is the terminatory VNF group 21. The aggregation LB group 22 is equivalent to a L4-termination type LB 13A, the VNF #3 is equivalent to a L3-termination type VNF 12, and each of the VNF #1 and the VNF #2 is equivalent to an L3-relay type VNF 12.

Figure 6:
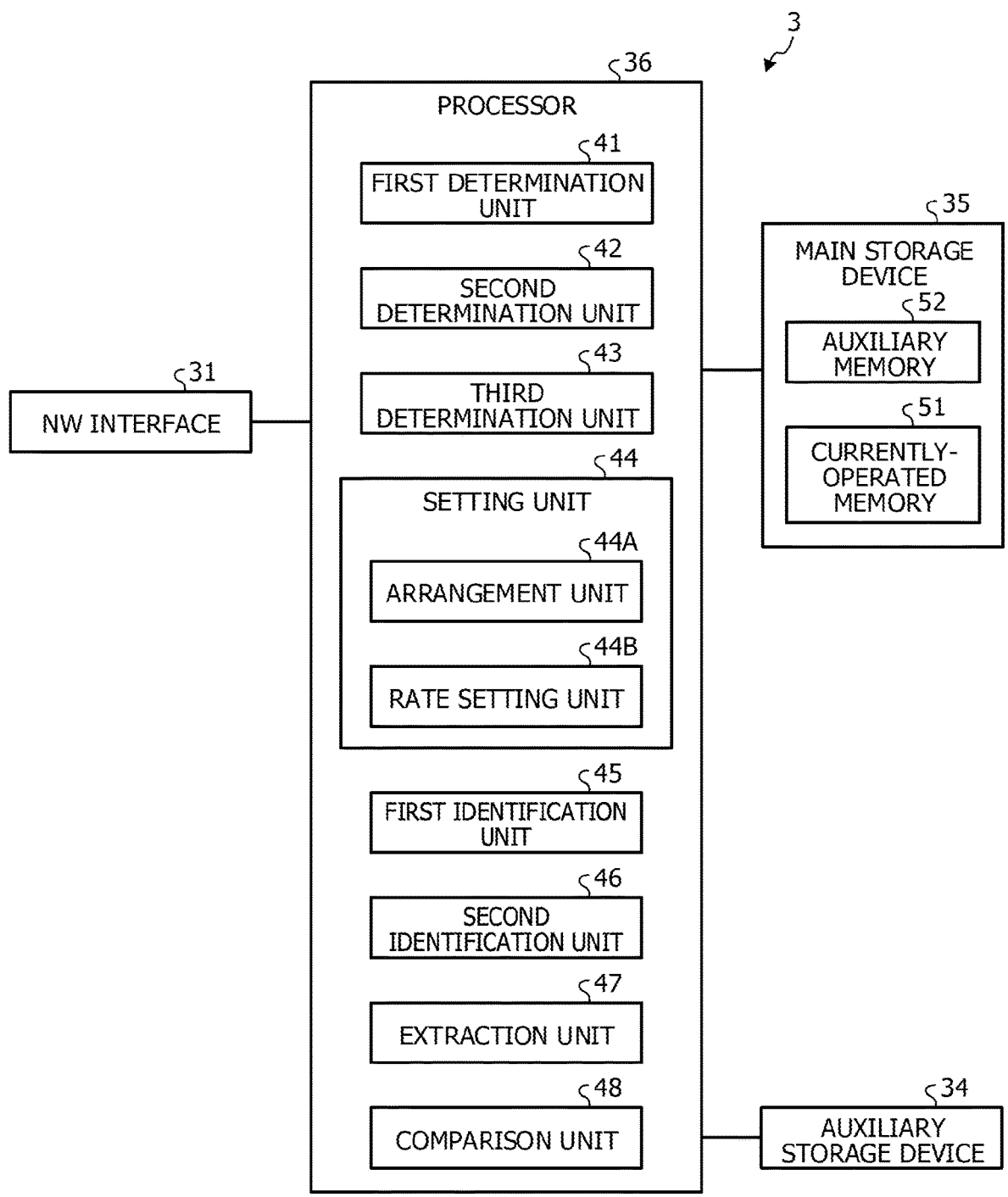
FIG. 6 is an explanatory diagram illustrating an example of a functional configuration of a processor of the management server of the present embodiment.

FIG. 6 is an explanatory diagram illustrating an example of a functional configuration of the processor 36 within the management server 3 of the present embodiment. The processor 36 illustrated in FIG. 6 includes a first determination unit 41, a second determination unit 42, a third determination unit 43, a setting unit 44, a first identification unit 45, a second identification unit 46, an extraction unit 47, and a comparison unit 48. It is assumed that a processing program related to a setting method is stored in the auxiliary storage device 34. The processor 36 reads the processing program related to the setting method from the auxiliary storage device 34. In addition, based on the read processing program, the processor 36 performs, as functions, the first determination unit 41, the second determination unit 42, the third determination unit 43, the setting unit 44, the first identification unit 45, the second identification unit 46, the extraction unit 47, and the comparison unit 48 on the processor 36. In response to a configuration request, the first determination unit 41 determines the number of the aggregation LB groups 22 of the service chain 20A and a topology configuration.

The second determination unit 42 identifies the terminatory VNF group 21 and the aggregation LB groups 22 from the topology configuration of the service chain 20A and determines transfer paths and traffic rates within the aggregation LB groups 22 and the VNF groups 21. Traffic rates of transfer paths of the aggregation LB groups 22 and the VNF groups 21 are traffic amounts able to be averaged by the VNF groups 21 on the transfer paths.

Based on the transfer paths and the traffic rates of the aggregation LB groups 22 and the VNF groups 21, the third determination unit 43 determines allocation rates of the aggregation LB groups 22 and transfer paths and traffic rates within the VNF groups 21. Based on the topology configuration, the setting unit 44 arranges, on virtual areas, and activates the VNF groups 21 and the aggregation LB groups 22 and sets transfer paths and traffic rates in the arranged VNF groups 21 and aggregation LB groups 22. The setting unit 44 includes an arrangement unit 44A and a rate setting unit 44B. Based on the topology configuration, the arrangement unit 44A arranges, on virtual areas, and activates the VNF groups 21 and the aggregation LB groups 22. The rate setting unit 44B sets transfer paths and traffic rates in the arranged VNF groups 21 and aggregation LB groups 22.

The first identification unit 45 identifies the terminatory VNF group 21 from the topology configuration of the service chain 20A. Note that the terminatory VNF group 21 is the VNF #3 including the proxy 1A to the proxy 1C that serve as the L3-termination type VNFs 12 and that are illustrated in FIG. 5, for example. Based on the topology configuration of the service chain 20A, the second identification unit 46 identifies the individual VNFs 12 to relay traffics addressed to the terminated VNFs 12 on transfer paths from the aggregation LB groups 22 to the individual terminatory VNFs 12 of the terminatory VNF group 21. Note that the terminatory VNFs 12 are the proxy 1A to the proxy 1C illustrated in, for example, FIG. 5 and the individual VNFs 12 on the transfer paths are the LB 1A, the LB 1B, the FW 1A to the FW 1D, the IDS 1A to the IDS 1C, and so forth, for example.

Based on the topology configuration, the extraction unit 47 extracts the output destination VNFs 12 that are located in a subsequent stage and to which traffics addressed to the terminated VNFs 12 are to be output, for each of the VNFs 12 on the transfer paths. For each of the VNFs 12 on the transfer paths, the extraction unit 47 extracts the output destination VNFs 12 of transfer paths, for each of which a path to one of the terminated VNFs 12 is an optimum path such as a shortest path. In a case of focusing attention on, for example, the FW 1A, the extraction unit 47 extracts the IDS 1A as the output destination VNF 12 to which a traffic addressed to the proxy 1A is transferred, and the extraction unit 47 extracts the IDS 1B as the output destination VNF 12 to which a traffic addressed to the proxy 1B is transferred. Furthermore, the extraction unit 47 extracts the IDS 1C as the output destination VNF 12 to which a traffic addressed to the proxy 1C is transferred. In addition, in a case of focusing attention on, for example, the FW 1C, the extraction unit 47 extracts the IDS 1A as the output destination VNF 12 to which a traffic addressed to the proxy 1A is transferred, and the extraction unit 47 extracts the IDS 1B as the output destination VNF 12 to which a traffic addressed to the proxy 1B is transferred. Furthermore, the extraction unit 47 extracts the IDS 1C as the output destination VNF 12 to which a traffic addressed to the proxy 1C is transferred. In addition, in a case of focusing attention on, for example, the IDS 1C, the extraction unit 47 extracts the proxy 1A as the output destination VNF 12 to which a traffic addressed to the proxy 1A is transferred, and the extraction unit 47 extracts the proxy 1B as the output destination VNF 12 to which a traffic addressed to the proxy 1B is transferred. Furthermore, the extraction unit 47 extracts the proxy 1C as the output destination VNF 12 to which a traffic addressed to the proxy 1C is transferred. For each of the VNFs 12 that are located on the transfer paths and that relay traffics addressed to the terminated VNFs 12, the extraction unit 47 registers, in an auxiliary memory 52, auxiliary transfer paths including the auxiliary output destination VNFs 12 to which traffics addressed to all the terminated VNFs 12 are to be transferred.

The main storage device 35 includes a currently-operated memory 51 and the auxiliary memory 52. For each of the VNFs 12 within the service chain 20A, the currently-operated memory 51 registers therein currently-operated transfer paths including the currently-operated output destination VNFs 12 to which traffics addressed to the terminated VNFs 12 are transferred. In contrast, for each of the VNFs 12, the auxiliary memory 52 registers therein auxiliary transfer paths including the auxiliary transfer destination VNFs 12.

After, for each of the VNFs 12 extracted by the extraction unit 47, registering, in the auxiliary memory 52, the auxiliary transfer paths including the auxiliary output destination VNFs 12 to which traffics addressed to the terminated VNFs 12 are to be transferred, the comparison unit 48 compares transfer paths within the auxiliary memory 52 with transfer paths within the currently-operated memory 51 for each of the VNFs 12. In a case where, based on a comparison result thereof, a currently-operated transfer path exists within the auxiliary memory 52, the comparison unit 48 deletes the output destination VNF 12 addressed to the terminated VNF 12 of that currently-operated transfer path. As a result, for each of the VNFs 12, auxiliary transfer paths other than currently-operated transfer paths are registered in the auxiliary memory 52.

The setting unit 44 sets auxiliary transfer paths of each of the VNFs 12 located on transfer paths currently registered in the auxiliary memory 52, in the relevant VNF 12. As a result, even in a case where auxiliary transfer paths are set, if a destination of a received traffic is appropriate to one of the currently-operated transfer paths, one of the VNFs 12 that are located on transfer paths and that relay traffics addressed to the terminated VNFs 12 transfers that received traffic to the output destination VNF 12 related to the corresponding one of the currently-operated transfer paths. In addition, even in a case where the destination of the received traffic is appropriate to none of the currently-operated transfer paths, if that destination is appropriate to one of the auxiliary transfer paths, one of the VNFs 12 located on transfer paths transfers that received traffic to the output destination VNF 12 related to the corresponding one of the auxiliary transfer paths. In other words, since setting the auxiliary transfer paths in addition to the currently-operated transfer paths, the VNFs 12 turn out to ensure the reachabilities of traffics addressed to all the terminated VNFs 12.

It is assumed that a currently-operated transfer path of the FW 1A is a path for transferring a traffic addressed to the proxy 1A to the IDS 1A serving as one of the output destination VNFs 12, for example. Furthermore, it is assumed that auxiliary transfer paths of the FW 1A are a path for transferring a traffic addressed to the proxy 1B to the IDS 1B serving as one of the output destination VNFs 12 and a path for transferring a traffic addressed to the proxy 1C to the IDS 1C. At this time, in a case where a traffic addressed to the proxy 1A is received, the FW 1A transfers the traffic addressed to the proxy 1A to the IDS 1A serving as one of the output destination VNFs 12 related to the currently-operated transfer paths. In addition, in a case where a traffic addressed to the proxy 1B is received, the FW 1A transfers the traffic addressed to the proxy 1B to the IDS 1B serving as one of the output destination VNFs 12 related to the auxiliary transfer paths. In addition, in a case where a traffic addressed to the proxy 1C is received, the FW 1A transfers the traffic addressed to the proxy 1C to the IDS 1C serving as one of the output destination VNFs 12 related to the auxiliary transfer paths. In addition to the currently-operated transfer paths, the FW 1A is able to make the auxiliary transfer paths available and is able to ensure traffic transferring addressed to all the proxy 1A to proxy 1C. Therefore, it is possible to avoid traffic discarding caused by a time difference before completion of setting changes.

In addition, it is assumed that currently-operated transfer paths of the FW 1C are a path for transferring a traffic addressed to the proxy 1B to the IDS 1B serving as one of the output destination VNFs 12 and a path for transferring a traffic addressed to the proxy 1C to the IDS 1C serving as one of the output destination VNFs 12. Furthermore, it is assumed that an auxiliary transfer path of the FW 1C is a path for transferring a traffic addressed to the proxy 1A to the IDS 1A serving as one of the output destination VNFs 12. At this time, in a case where a traffic addressed to the proxy 1B is received, the FW 1C transfers the traffic addressed to the proxy 1B to the IDS 1B serving as one of the output destination VNFs 12 related to the currently-operated transfer paths. In addition, in a case where a traffic addressed to the proxy 1A is received, the FW 1C transfers the traffic addressed to the proxy 1A to the IDS 1A serving as one of the output destination VNFs 12 related to the auxiliary transfer paths. In addition to the currently-operated transfer paths, the FW 1C is able to make the auxiliary transfer paths available and is able to ensure traffic transferring addressed to all the proxy 1A to proxy 1C. Therefore, it is possible to avoid traffic discarding caused by a time difference before completion of setting changes.

FIG. 7 is an explanatory diagram illustrating examples of currently-operated setting information and auxiliary setting information before addition of the FW 1E. Note that, for convenience of explanation, the currently-operated setting information and auxiliary setting information illustrated in FIG. 7 are currently-operated setting information and auxiliary setting information of the service chain system 20A illustrated in FIG. 5 before addition of the FW 1E.

The currently-operated setting information illustrated in FIG. 7 includes currently-operated allocation rates of the LB 1A and the LB 1B and currently-operated transfer paths of the LB 1A, the LB 1B, the FW 1A to the FW 1D, and the IDS 1A to the IDS 1C. Note that it is assumed that the currently-operated setting information is stored in the currently-operated memory 51. A currently-operated allocation rate of the LB 1A is two eighths of the entire traffic amount, in other words, two quarters of a traffic amount received by the LB 1A turns out to be transferred to the FW 1A addressed to the proxy 1A. A currently-operated allocation rate of the LB 1A is one eighth of the entire traffic amount, in other words, one quarter of the traffic amount received by the LB 1A turns out to be transferred to the FW 1B addressed to the proxy 1B. Furthermore, a currently-operated allocation rate of the LB 1A is one eighth of the entire traffic amount, in other words, one quarter of the traffic amount received by the LB 1A turns out to be transferred to the FW 1C addressed to the proxy 1C.

A currently-operated allocation rate of the LB 1B is one eighth of the entire traffic amount, in other words, one quarter of a traffic amount received by the LB 1B turns out to be transferred to the FW 1B addressed to the proxy 1A. A currently-operated allocation rate of the LB 1B is one eighth of the entire traffic amount, in other words, one quarter of the traffic amount received by the LB 1B turns out to be transferred to the FW 1C addressed to the proxy 1B. Furthermore, a currently-operated allocation rate of the LB 1B is two eighths of the entire traffic amount, in other words, two quarters of the traffic amount received by the LB 1B turns out to be transferred to the FW 1D addressed to the proxy 1C.

Currently-operated transfer paths of the LB 1A include a path for transferring a traffic addressed to the proxy 1A to the FW 1A serving as one of the currently-operated output destination VNFs 12 and a path for transferring a traffic addressed to the proxy 1B to the FW 1B serving as one of the currently-operated output destination VNFs 12. Furthermore, the currently-operated transfer paths of the LB 1A includes a path for transferring a traffic addressed to the proxy 1C to the FW 1C serving as one of the currently-operated output destination VNFs 12.

Currently-operated transfer paths of the LB 1B include a path for transferring a traffic addressed to the proxy 1A to the FW 1B serving as one of the currently-operated output destination VNFs 12 and a path for transferring a traffic addressed to the proxy 1B to the FW 1C serving as one of the currently-operated output destination VNFs 12. The currently-operated transfer paths of the LB 1B includes a path for transferring a traffic addressed to the proxy 1C to the FW 1D serving as one of the currently-operated output destination VNFs 12.

A currently-operated transfer path of the FW 1A includes a path for transferring a traffic addressed to the proxy 1A to the IDS 1A serving as one of the currently-operated output destination VNFs 12. Currently-operated transfer paths of the FW 1B include a path for transferring a traffic addressed to the proxy 1A to the IDS 1A serving as one of the currently-operated output destination VNFs 12 and a path for transferring a traffic addressed to the proxy 1B to the IDS 1B serving as one of the currently-operated output destination VNFs 12. Currently-operated transfer paths of the FW 1C include a path for transferring a traffic addressed to the proxy 1B to the IDS 1B serving as one of the currently-operated output destination VNFs 12 and a path for transferring a traffic addressed to the proxy 1C to the IDS 1C serving as one of the currently-operated output destination VNFs 12. A currently-operated transfer path of the FW 1D includes a path for transferring a traffic addressed to the proxy 1C to the IDS 1C serving as one of the currently-operated output destination VNFs 12. Note that since being in a state before addition of the FW 1E, a currently-operated transfer path of the FW 1E is "None".

A currently-operated transfer path of the IDS 1A includes a path for transferring a traffic addressed to the proxy 1A to the proxy 1A serving as one of the currently-operated output destination VNFs 12. A currently-operated transfer path of the IDS 1B includes a path for transferring a traffic addressed to the proxy 1B to the proxy 1B serving as one of the currently-operated output destination VNFs 12. A currently-operated transfer path of the IDS 1C includes a path for transferring a traffic addressed to the proxy 1C to the proxy 1C serving as one of the currently-operated output destination VNFs 12.

In addition, the auxiliary setting information illustrated in FIG. 7 includes auxiliary transfer paths of the LB 1A, the LB 1B, the FW 1A to the FW 1E, and the IDS 1A to the IDS 1C. Note that it is assumed that the auxiliary setting information is stored in the auxiliary memory 52. Since being the same as those of the currently-operated output destination VNFs 12, the auxiliary transfer paths of the LB 1A and the LB 1B are deleted. Auxiliary transfer paths of the FW 1A include a path for transferring a traffic addressed to the proxy 1B to the IDS 1B serving as one of the auxiliary output destination VNFs 12 and a path for transferring a traffic addressed to the proxy 1C to the IDS 1C serving as one of the auxiliary output destination VNFs 12. Note that since being a path for transferring a traffic addressed to the proxy 1A to the IDS 1A, the currently-operated transfer path of the FW 1A is deleted from the auxiliary transfer paths of the FW 1A.

An auxiliary transfer path of the FW 1B includes a path for transferring a traffic addressed to the proxy 1C to the IDS 1C serving as one of the auxiliary output destination VNFs 12. Note that since being a path for transmitting, via the IDS 1A, a traffic addressed to the proxy 1A and a path for transferring a traffic addressed to the proxy 1B to the IDS 1B, the currently-operated transfer paths of the FW 1B are deleted from the auxiliary transfer paths of the FW 1B. An auxiliary transfer path of the FW 1C includes a path for transferring a traffic addressed to the proxy 1A to the IDS 1A serving as one of the auxiliary output destination VNFs 12. Note that since being a path for transmitting a traffic addressed to the proxy 1B to the IDS 1B and a path for transferring a traffic addressed to the proxy 1C to the IDS 1C, the currently-operated transfer paths of the FW 1C are deleted from the auxiliary transfer paths of the FW 1C. Auxiliary transfer paths of the FW 1D include a path for transferring a traffic addressed to the proxy 1A to the IDS 1A serving as one of the auxiliary output destination VNFs 12 and a path for transferring a traffic addressed to the proxy 1B to the IDS 1B serving as one of the auxiliary output destination VNFs 12. Note that since being a path for transferring a traffic addressed to the proxy 1C to the IDS 1C, the currently-operated transfer path of the FW 1D is deleted from the auxiliary transfer paths of the FW 1D. Since being in a state before addition of the FW 1E, an auxiliary transfer path of the FW 1E is set to "None".

Auxiliary transfer paths of the IDS 1A include a path for transferring a traffic addressed to the proxy 1B to the IDS 1B serving as one of the auxiliary output destination VNFs 12 and a path for transferring a traffic addressed to the proxy 1C to the IDS 1C serving as one of the auxiliary output destination VNFs 12. Note that since being a path for transferring a traffic addressed to the proxy 1A to the IDS 1A, the currently-operated transfer path of the IDS 1A is deleted from the auxiliary transfer paths of the IDS 1A.

Auxiliary transfer paths of the IDS 1B include a path for transferring a traffic addressed to the proxy 1A to the IDS 1A serving as one of the auxiliary output destination VNFs 12 and a path for transferring a traffic addressed to the proxy 1C to the IDS 1C serving as one of the auxiliary output destination VNFs 12. Note that since being a path for transferring a traffic addressed to the proxy 1B to the IDS 1B, the currently-operated transfer path of the IDS 1B is deleted from the auxiliary transfer paths of the IDS 1B. Auxiliary transfer paths of the IDS 1C include a path for transferring a traffic addressed to the proxy 1A to the proxy 1A serving as one of the auxiliary output destination VNFs 12 and a path for transferring a traffic addressed to the proxy 1B to the proxy 1B serving as one of the auxiliary output destination VNFs 12. Note that since being a path for transferring a traffic addressed to the proxy 1C to the IDS 1C, the currently-operated transfer path of the IDS 1C is deleted from the auxiliary transfer paths of the IDS 1C.

Figure 8:
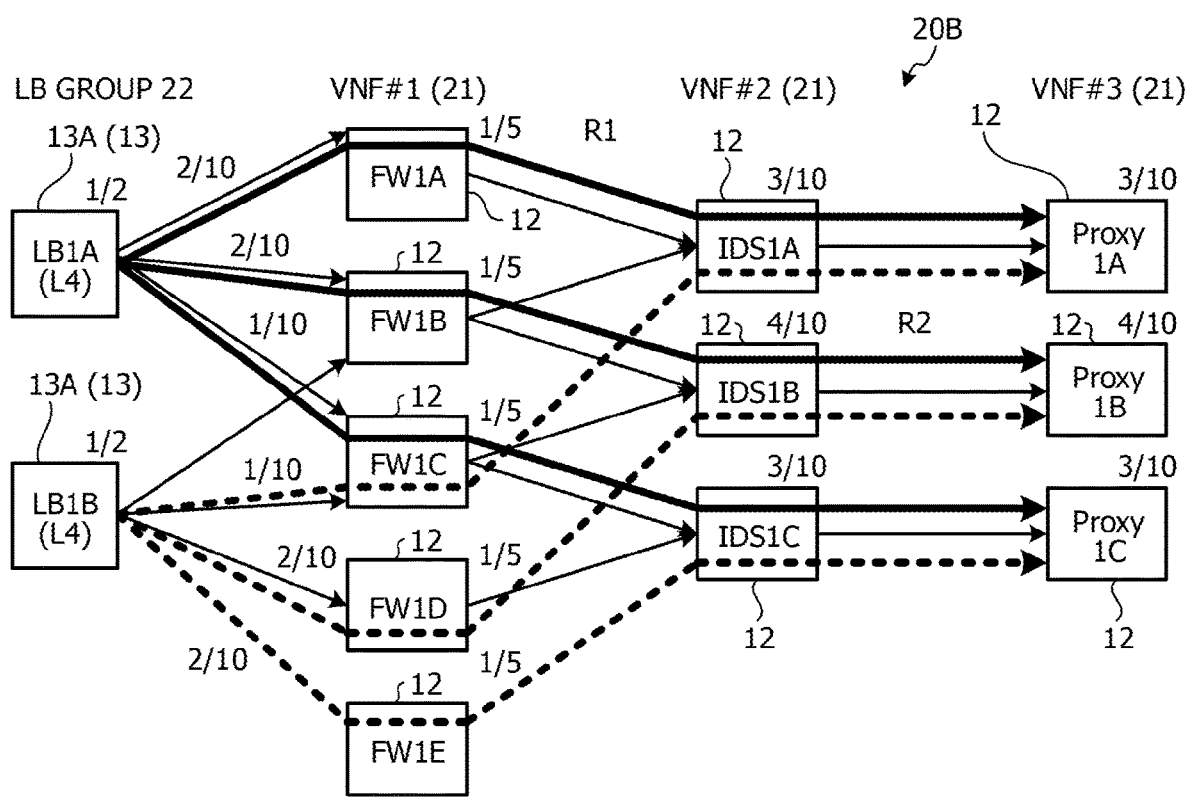
FIG. 8 is an explanatory diagram illustrating an example of an arrangement configuration of a service chain after the addition of the FW.

Upon detecting, for example, an increase in a load within the VNF #1 in the service chain 20A, the management server 3 performs scale-out for adding the FW 1E to the VNF #1. FIG. 8 is an explanatory diagram illustrating an example of an arrangement configuration of a service chain 20B after the addition of the FW 1E. Note that the same symbol is assigned to the same configuration as that of the service chain 20A illustrated in FIG. 5, thereby omitting descriptions of a redundant configuration and an operation thereof.

Upon detecting a configuration request to add the FW 1E, the processor 36 within the management server 3 performs the service chain construction processing illustrated in FIG. 4. As a result, the currently-operated setting information and the auxiliary setting information after the addition of the FW 1E turn out to be updated in the currently-operated memory 51 and the auxiliary memory 52, respectively. FIG. 9 is an explanatory diagram illustrating examples of the currently-operated setting information and the auxiliary setting information after the addition of the FW 1E.

A currently-operated allocation rate of the LB 1A in the currently-operated setting information illustrated in FIG. 9 is two tenths of the entire traffic amount, in other words, two fifths of a traffic amount received by the LB 1A turns out to be transferred to the FW 1A addressed to the proxy 1A. A currently-operated allocation rate of the LB 1A is two tenths of the entire traffic amount, in other words, two fifths of the traffic amount received by the LB 1A turns out to be transferred to the FW 1B addressed to the proxy 1B. Furthermore, a currently-operated allocation rate of the LB 1A is one tenth of the entire traffic amount, in other words, one fifth of the traffic amount received by the LB 1A turns out to be transferred to the FW 1C addressed to the proxy 1C.

A currently-operated allocation rate of the LB 1B is one tenth of the entire traffic amount, in other words, one fifth of a traffic amount received by the LB 1B turns out to be transferred to the FW 1C addressed to the proxy 1A. A currently-operated allocation rate of the LB 1B is two tenths of the entire traffic amount, in other words, two fifths of the traffic amount received by the LB 1B turns out to be transferred to the FW 1D addressed to the proxy 1B. Furthermore, a currently-operated allocation rate of the LB 1B is two tenths of the entire traffic amount, in other words, two fifths of the traffic amount received by the LB 1B turns out to be transferred to the FW 1E addressed to the proxy 1C.

Currently-operated transfer paths of the LB 1A include a path for transferring a traffic addressed to the proxy 1A to the FW 1A serving as one of the currently-operated output destination VNFs 12 and a path for transferring a traffic addressed to the proxy 1B to the FW 1B serving as one of the currently-operated output destination VNFs 12. Furthermore, a currently-operated transfer path of the LB 1A includes a path for transferring a traffic addressed to the proxy 1C to the FW 1C serving as one of the currently-operated output destination VNFs 12.

Currently-operated transfer paths of the LB 1B include a path for transferring a traffic addressed to the proxy 1A to the FW 1C serving as one of the currently-operated output destination VNFs 12 and a path for transferring a traffic addressed to the proxy 1B to the FW 1D serving as one of the currently-operated output destination VNFs 12. A currently-operated transfer path of the LB 1B includes a path for transferring a traffic addressed to the proxy 1C to the FW 1E serving as one of the currently-operated output destination VNFs 12.

A currently-operated transfer path of the FW 1A includes a path for transferring a traffic addressed to the proxy 1A to the IDS 1A serving as one of the currently-operated output destination VNFs 12. A currently-operated transfer path of the FW 1B includes a path for transferring a traffic addressed to the proxy 1B to the IDS 1B serving as one of the currently-operated output destination VNFs 12. Currently-operated transfer paths of the FW 1C include a path for transferring a traffic addressed to the proxy 1A to the IDS 1A serving as one of the currently-operated output destination VNFs 12 and a path for transferring a traffic addressed to the proxy 1C to the IDS 1C serving as one of the currently-operated output destination VNFs 12. A currently-operated transfer path of the FW 1D includes a path for transferring a traffic addressed to the proxy 1B to the IDS 1B serving as one of the currently-operated output destination VNFs 12. A currently-operated transfer path of the FW 1E includes a path for transferring a traffic addressed to the proxy 1C to the IDS 1C serving as one of the currently-operated output destination VNFs 12.

A currently-operated transfer path of the IDS 1A includes a path for transferring a traffic addressed to the proxy 1A to the proxy 1A serving as one of the currently-operated output destination VNFs 12. A currently-operated transfer path of the IDS 1B includes a path for transferring a traffic addressed to the proxy 1B to the proxy 1B serving as one of the currently-operated output destination VNFs 12. A currently-operated transfer path of the IDS 1C includes a path for transferring a traffic addressed to the proxy 1C to the proxy 1C serving as one of the currently-operated output destination VNFs 12.

In addition, since being the same as those of the currently-operated output destination VNFs 12, the auxiliary transfer paths of the LB 1A and the LB 1B in the auxiliary setting information illustrated in FIG. 9 are deleted.

Auxiliary transfer paths of the FW 1A include a path for transferring a traffic addressed to the proxy 1B to the IDS 1B serving as one of the auxiliary output destination VNFs 12 and a path for transferring a traffic addressed to the proxy 1C to the IDS 1C serving as one of the auxiliary output destination VNFs 12. Note that since being a path for transferring a traffic addressed to the proxy 1A to the IDS 1A, the currently-operated transfer path of the FW 1A is deleted from the auxiliary transfer paths of the FW 1A.

Auxiliary transfer paths of the FW 1B include a path for transferring a traffic addressed to the proxy 1A to the IDS 1A serving as one of the auxiliary output destination VNFs 12 and a path for transferring a traffic addressed to the proxy 1C to the IDS 1C serving as one of the auxiliary output destination VNFs 12. Note that since being a path for transferring a traffic addressed to the proxy 1B to the IDS 1B, the currently-operated transfer path of the FW 1B is deleted from the auxiliary transfer paths of the FW 1B. An auxiliary transfer path of the FW 1C includes a path for transferring a traffic addressed to the proxy 1B to the IDS 1B serving as one of the auxiliary output destination VNFs 12. Note that since being a path for transmitting a traffic addressed to the proxy 1A to the IDS 1A and a path for transferring a traffic addressed to the proxy 1C to the IDS 1C, the currently-operated transfer paths of the FW 1C are deleted from the auxiliary transfer paths of the FW 1C. Auxiliary transfer paths of the FW 1D include a path for transferring a traffic addressed to the proxy 1A to the IDS 1A serving as one of the auxiliary output destination VNFs 12 and a path for transferring a traffic addressed to the proxy 1C to the IDS 1C serving as one of the auxiliary output destination VNFs 12. Note that since being a path for transferring a traffic addressed to the proxy 1B to the IDS 1B, the currently-operated transfer path of the FW 1D is deleted from the auxiliary transfer paths of the FW 1D. Auxiliary transfer paths of the FW 1E include a path for transferring a traffic addressed to the proxy 1A to the IDS 1A serving as one of the auxiliary output destination VNFs 12 and a path for transferring a traffic addressed to the proxy 1B to the IDS 1B serving as one of the auxiliary output destination VNFs 12. Note that since being a path for transferring a traffic addressed to the proxy 1C to the IDS 1C, the currently-operated transfer path of the FW 1E is deleted from the auxiliary transfer paths of the FW 1E.

Auxiliary transfer paths of the IDS 1A include a path for transferring a traffic addressed to the proxy 1B to the IDS 1B serving as one of the auxiliary output destination VNFs 12 and a path for transferring a traffic addressed to the proxy 1C to the IDS 1C serving as one of the auxiliary output destination VNFs 12. Note that since being a path for transferring a traffic addressed to the proxy 1A to the IDS 1A, the currently-operated transfer path of the IDS 1A is deleted from the auxiliary transfer paths of the IDS 1A. Auxiliary transfer paths of the IDS 1B include a path for transferring a traffic addressed to the proxy 1A to the IDS 1A serving as one of the auxiliary output destination VNFs 12 and a path for transferring a traffic addressed to the proxy 1C to the IDS 1C serving as one of the auxiliary output destination VNFs 12. Note that since being a path for transferring a traffic addressed to the proxy 1B to the IDS 1B, the currently-operated transfer path of the IDS 1B is deleted from the auxiliary transfer paths of the IDS 1B. Auxiliary transfer paths of the IDS 1C include a path for transferring a traffic addressed to the proxy 1A to the proxy 1A serving as one of the auxiliary output destination VNFs 12 and a path for transferring a traffic addressed to the proxy 1B to the proxy 1B serving as one of the auxiliary output destination VNFs 12. Note that since being a path for transferring a traffic addressed to the proxy 1C to the IDS 1C, the currently-operated transfer path of the IDS 1C is deleted from the auxiliary transfer paths of the IDS 1C.

Next, an operation of the service chain system of the present embodiment will be described. Upon detecting, for example, an increase in a load of the VNF #1 of the service chain 20A illustrated in FIG. 5, the management server 3 reconstructs the service chain 20B illustrated in FIG. 8. At a time of performing the service chain construction processing for the service chain 20A illustrated in FIG. 5, the management server 3 registers, in the currently-operated memory 51, the currently-operated setting information illustrated in FIG. 7. Furthermore, the management server 3 performs auxiliary setting processing after performing the service chain construction processing and registers the auxiliary setting information in the auxiliary memory 52.

Figure 10:
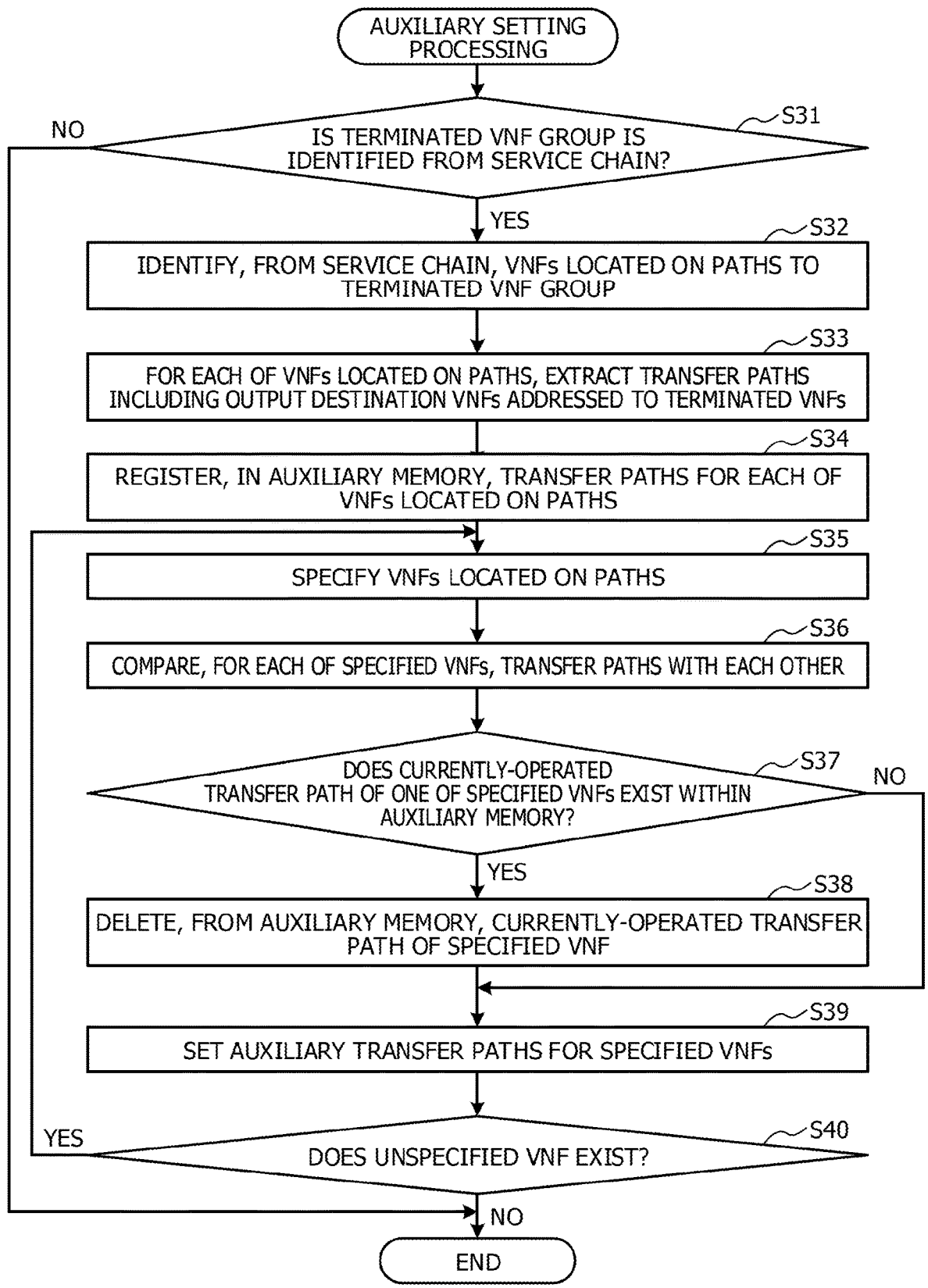
FIG. 10 is a flowchart illustrating an example of a processing operation of the processor within the management server related to auxiliary setting processing.

FIG. 10 is a flowchart illustrating an example of a processing operation of the processor 36 within the management server 3 related to auxiliary setting processing. In FIG. 10, the first identification unit 45 in the processor 36 determines whether or not a terminated VNF group is identified from the service chain 20B (step S31). Note that, in a case of the service chain 20A illustrated in FIG. 5, the terminated VNF group is the VNF #3 of the proxy 1A to the proxy 1C.

In a case where the terminated VNF group is identified (step S31: affirmative), the second identification unit 46 within the processor 36 identifies, from the service chain, the VNFs 12 located on paths to the terminated VNF group (step S32). Note that, in a case of the service chain 20A illustrated in FIG. 5, the VNFs 12 located on paths to the terminated VNF group are the VNFs 12 located on paths for relaying traffics from the aggregation LB group 22 to the proxy 1A to the proxy 1C. The VNFs 12 located on the paths are the LB 1A, the LB 1B, the FW 1A to the FW 1D, and the IDS 1A to the IDS 1C, for example.

For each of the VNFs 12 located on the paths, the extraction unit 47 within the processor 36 extracts transfer paths including the output destination VNFs 12 addressed to the terminated VNFs 12 (step S33). Note that, in a case of the service chain 20A illustrated in FIG. 5, the terminated VNFs 12 are the proxy 1A to the proxy 1C. In a case of focusing attention on, for example, the FW 1B, the extraction unit 47 extracts a transfer path for transferring a traffic addressed to the proxy 1A to the IDS 1A and a transfer path for transferring a traffic addressed to the proxy 1B to the IDS 1B. Furthermore, the extraction unit 47 extracts a transfer path for transferring a traffic addressed to the proxy 1C to the IDS 1C.

The extraction unit 47 registers, in the auxiliary memory 52, transfer paths extracted for the individual VNFs 12 located on the paths (step S34). The comparison unit 48 within the processor 36 specifies the VNFs 12 located on the paths for relaying traffics addressed to the terminated VNFs 12 (step S35) and compares, for each of the specified VNFs 12, transfer paths stored in the currently-operated memory 51 and the auxiliary memory 52 with each other (step S36). Note that the comparing transfer paths with each other means processing for comparing a transfer path currently stored in the currently-operated memory 51 and a transfer path currently stored in the auxiliary memory 52 with each other for each of the specified VNFs 12.

Based on a comparison result, the comparison unit 48 determines whether or not a currently-operated transfer path of one of the specified VNFs 12 exists within the auxiliary memory 52 (step S37). In a case where a currently-operated transfer path of one of the specified VNFs 12 exists within the auxiliary memory 52 (step S37: affirmative), the comparison unit 48 deletes, from the auxiliary memory 52, the currently-operated transfer path of the relevant specified VNF 12 (step S38). In a case of focusing attention on, for example, the FW 1A of the auxiliary setting information illustrated in FIG. 7, the currently-operated transfer path is a path for transferring a traffic addressed to the proxy 1A to the FW 1A.

In addition, the setting unit 44 within the processor 36 sets, for the specified VNFs 12, auxiliary transfer paths corresponding to the specified VNFs 12 within the auxiliary memory 52 (step S39) and determines whether or not an unspecified one of the VNFs 12 exists (step S40). In a case where an unspecified one of the VNFs 12 does not exist (step S40: negative), the setting unit 44 terminates the processing operation illustrated in FIG. 10.

In a case where an unspecified one of the VNFs 12 exists (step S40: affirmative), the comparison unit 48 makes a transition to step S35 so as to specify, from the VNFs 12 located on the paths, an unspecified one of the VNFs 12. In a case where it is difficult to identify the terminated VNF group from the service chain (step S31: negative), the first identification unit 45 terminates the processing operation illustrated in FIG. 10. In a case where no currently-operated transfer path of one of the specified VNFs 12 exists within the auxiliary memory 52 (step S37: negative), the setting unit 44 makes a transition to step S39 so as to set an auxiliary transfer path within the auxiliary memory 52 for the relevant specified VNF 12.

The processor 36 that performs the auxiliary setting processing registers, in the auxiliary memory 51, auxiliary transfer paths including the output destination VNFs 12 addressed to the terminated VNFs 12, for each of the VNFs 12 located on the paths for relaying traffics addressed to the terminated VNFs 12, and the processor 36 sets these auxiliary transfer paths for each of the VNFs 12 located on the paths. As a result, even in a case where the configuration of the service chain is changed, transfer paths addressed to all the terminated VNFs 12 are secured, and therefore, the VNFs 12 located on the paths are able to avoid traffic discarding caused by a time difference before completion of a setting change.

Upon detecting a configuration request to change a service chain, the management server 3 performs the service chain construction processing. At this time, the management server 3 turns out to set transfer paths and traffic rates in the aggregation LB group 22 and the VNF groups 21, arranged on the service chain. Furthermore, since being able to use currently-operated transfer paths and auxiliary transfer paths until setting changes of the transfer paths and the traffic rates of the VNF groups 21 and the aggregation LB group 22 are completed, the management server 3 is able to avoid traffic discarding.

At a time of changing from the service chain 20A illustrated in FIG. 5 to the service chain 20B illustrated in FIG. 8, the management server 3 turns out to use the currently-operated transfer paths and the auxiliary transfer paths before addition of the FW 1E, illustrated in FIG. 7, until these setting changes are completed.

Figure 11:
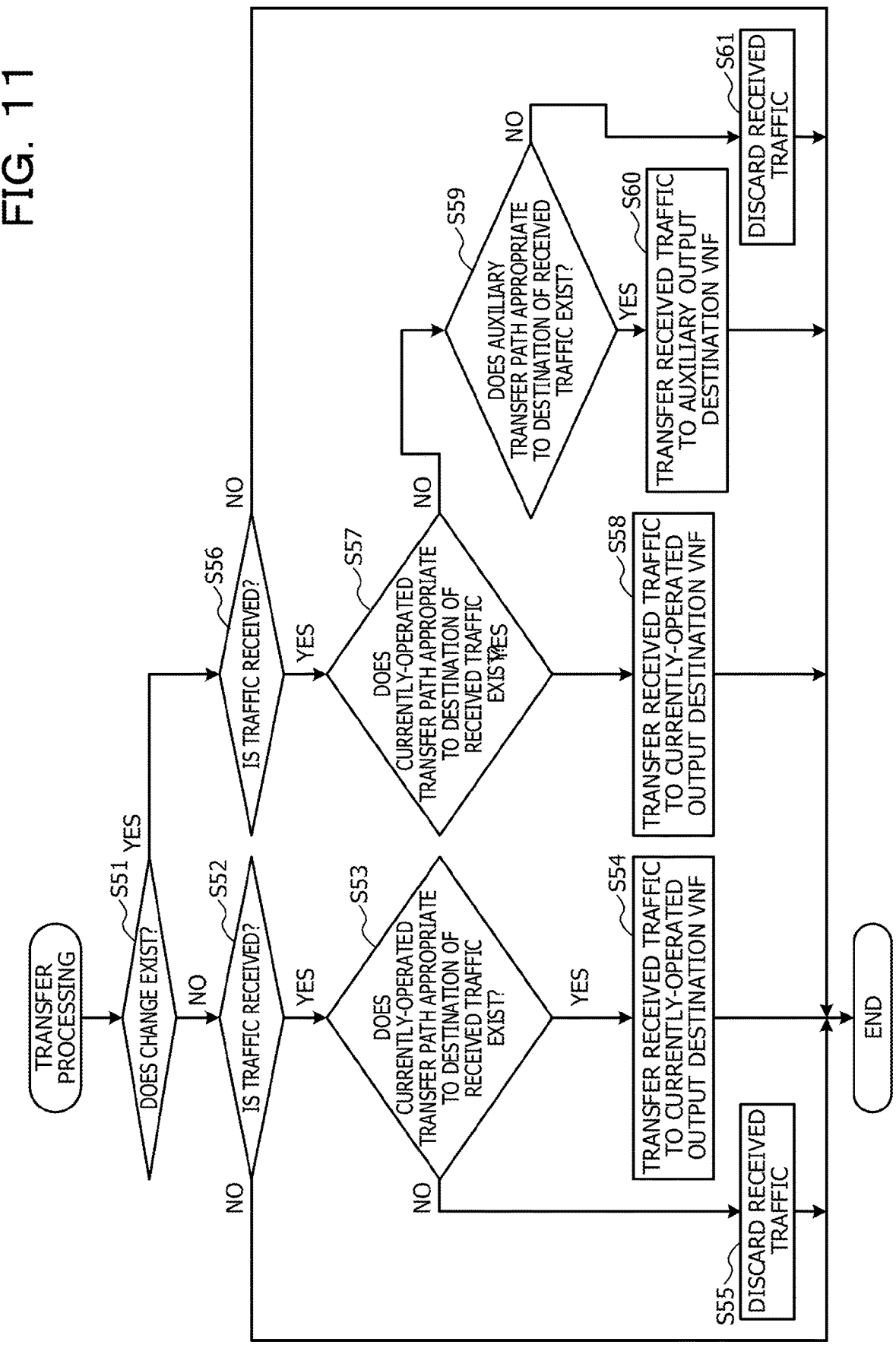
FIG. 11 is a flowchart illustrating an example of a processing operation of each of VNFs related to transfer processing.

Next, there will be described operations of the VNFs 12 located on paths of the service chain between starting of setting changes and completion of the setting changes. FIG. 11 is a flowchart illustrating an example of a processing operation of each of the VNFs 12 related to transfer processing. In FIG. 11, the VNF 12 determines whether or not a setting change is detected (step S51). Note that the setting change is a setting change such as scale-out (addition of a VNF) of a service chain or scale-in (deletion of a VNF) thereof, for example.

In a case where no setting change is detected (step S51: negative), the VNF 12 determines whether or not a traffic is received (step S52). In a case where a traffic is received (step S52: affirmative), the VNF 12 determines whether or not a currently-operated transfer path appropriate to a destination of the received traffic exists (step S53).

In a case where a currently-operated transfer path appropriate to a destination of the received traffic exists (step S53: affirmative), the VNF 12 transfers the received traffic to the currently-operated output destination VNF 12 (step S54) and terminates the processing operation illustrated in FIG. 11. Note that the currently-operated output destination VNF 12 is the output destination VNF 12 addressed to the terminated VNF 12 of the currently-operated transfer path. In a case where no currently-operated transfer path appropriate to a destination of the received traffic exists (step S53: negative), the VNF 12 discards the received traffic (step S55) and terminates the processing operation illustrated in FIG. 11.

In a case where no traffic is received (step S52: negative), the VNF 12 terminates the processing operation illustrated in FIG. 11. In a case where a setting change is detected (step S51: affirmative), the VNF 12 determines whether or not a traffic is received (step S56). In a case where a traffic is received (step S56: affirmative), the VNF 12 determines whether or not a currently-operated transfer path appropriate to a destination of the received traffic exists (step S57).

In a case where a currently-operated transfer path appropriate to a destination of the received traffic exists (step S57: affirmative), the VNF 12 transfers the received traffic to the currently-operated output destination VNF 12 (step S58) and terminates the processing operation illustrated in FIG. 11.

In a case where no traffic is received (step S56: negative), the VNF 12 terminates the processing operation illustrated in FIG. 11. In a case where no currently-operated transfer path appropriate to a destination of the received traffic exists (step S57: negative), the VNF 12 determines whether or not an auxiliary transfer path appropriate to a destination of the received traffic exists (step S59).

In a case where an auxiliary transfer path appropriate to a destination of the received traffic exists (step S59: affirmative), the VNF 12 transfers the received traffic to the auxiliary output destination VNF 12 (step S60) and terminates the processing operation illustrated in FIG. 11. Note that the auxiliary output destination VNF 12 is the output destination VNF 12 addressed to the terminated VNF 12 of the auxiliary transfer path. As a result, since transferring the received traffic to the auxiliary output destination VNF 12 appropriate to a destination of the received traffic, the VNF 12 is able to avoid traffic discarding.

In a case where no auxiliary transfer path appropriate to a destination of the received traffic exists (step S59: negative), the VNF 12 discards the received traffic (step S61) and terminates the processing operation illustrated in FIG. 11.

In a case where a currently-operated transfer path appropriate to a destination of the received traffic exists during a setting change, the VNF 12 that performs the transfer processing illustrated in FIG. 11 transfers the received traffic to the currently-operated output destination VNF 12. As a result, in a case where a destination of the received traffic is appropriate to a currently-operated transfer path even during a setting change, the VNF 12 is able to transfer the received traffic.

Even in a case where no currently-operated transfer path appropriate to a destination of the received traffic exists during a setting change, if an auxiliary transfer path appropriate to the destination exists, the VNF 12 transfers the received traffic to the auxiliary output destination VNF 12. As a result, even during a setting change, the VNF 12 is able to avoid traffic discarding caused by a time difference before completion of the setting change.

The management server 3 of the present embodiment identifies the termination type VNF group 21 from the VNF groups 21 arranged in stages on the virtual areas. Furthermore, for each of the VNFs 12 within the VNF groups 21 that relay traffics to the termination type VNF group 21, the management server 3 extracts auxiliary transfer paths of the output destination VNFs 12 to which traffics addressed to the individual termination type VNFs 12 within the termination type VNF group 21 are output. For each of the VNFs 12 that relay traffics to the termination type VNF group 21, the management server 3 sets, as auxiliary transfer paths, the output destination VNFs 12 addressed to the termination type VNFs 12. As a result, even in a case where the configuration of the service chain is changed, the individual VNFs 12 are able to use auxiliary transfer paths in addition to the currently-operated transfer paths, and therefore, the individual VNFs 12 are able to avoid traffic discarding caused by a time difference before completion of setting changes of the respective VNFs 12.

At a time of arranging the VNF groups 21 in stages on the virtual areas, the management server 3 determines the aggregation LBs 13A to be arranged in a stage preceding the VNF group 21 located in the first stage out of the stages. Based on loads between the aggregation LBs 13A and the terminated VNFs 12 located within the termination type VNF group 21 out of the VNF groups 12 located in the stages, the management server 3 determines communication paths to be operated. The management server 3 sets the determined communication paths to be operated, in the aggregation LBs 13A and the individual VNFs 12, arranged on the virtual areas. As a result, by reducing the number of the LBs, it is possible to suppress a transfer delay.

For each of the VNFs 12 that relay traffics to the termination type VNF group 21 between the aggregation LBs 13A and the termination type VNF group 21, the extraction unit 47 within the management server 3 extracts the output destination VNFs 12 to which traffics addressed to the termination type VNFs 12 are to be output. As a result, for each of the VNFs 12, the management server 3 is able to acquire an auxiliary transfer path.

After the output destination VNFs 12 to which traffics addressed to the termination type VNFs 12 are to be output are extracted for each of the VNFs 12 that relay traffics to the termination type VNF group 21, the comparison unit 48 within the management server 3 deletes the output destination VNFs 12 that are related to currently-operated transfer paths and that are included in the extracted output destination VNFs 12. As a result, the management server 3 is able to avoid registering redundant transfer paths within the auxiliary memory 52.

In a case where a configuration request of scale-out for adding the FW 1E into the service chain 20A illustrated in, for example, FIG. 5 is detected, the management server 3 transfers received traffics by using auxiliary transfer paths or currently-operated transfer paths, which are used for the individual VNFs 12 before addition of the FW 1E and which are illustrated in FIG. 7. As a result, even in a case where a setting change for scale-out occurs, the VNFs 12 are able to avoid traffic discarding caused by a time difference of the setting change. In contrast, it is assumed that the management server 3 detects a configuration request of scale-in for deleting the FW 1E within the service chain 20B illustrated in FIG. 8 and for changing to the service chain 20A. Even in a case where a setting change of scale-in occurs, the management server 3 is able to transfer received traffics by using auxiliary transfer paths or currently-operated transfer paths, which are used for the individual VNFs 12 after addition of the FW 1E and which are illustrated in FIG. 9. As a result, even in a case where a setting change for scale-in occurs, the VNFs 12 are able to avoid traffic discarding caused by a time difference of the setting change.

While, in the above-mentioned embodiments, the auxiliary setting processing illustrated in FIG. 10 is performed after the service chain construction processing illustrated in FIG. 4 is performed, the auxiliary setting processing may be performed in parallel to the service chain construction processing, and an arbitrary change may be adopted.

While, in the auxiliary setting processing illustrated in FIG. 10, a currently-operated transfer path of the specified VNF 12 is deleted from the auxiliary memory 52 in step S38, a currently-operated transfer path does not have to be deleted in the auxiliary memory 52, and an arbitrary change may be adopted.

While, in the auxiliary setting processing, the VNFs 12 located on the paths are specified in step S35 and transfer paths are compared with each other for each of the specified VNFs 12, the VNFs 12 may be collectively specified while the VNFs 12 are not individually specified, and comparison processing between transfer paths may be collectively performed.

While, in the service chain 20A illustrated in FIG. 5, a configuration in which an arrangement of three stages of the VNF #1 to the VNF #3 is adopted, there is no limitation to this, and an arbitrary change may be adopted.

While, in the service chain 20A, the proxy 1A to the proxy 1C of the VNF #3 located in the final stage are defined as the terminated VNFs 12, there is no limitation to the final stage, and the service chain may adopt a configuration of 10 stages of the first VNF group 21 to a tenth VNF group 21, for example. Furthermore, a configuration of 10 stages of the aggregation LB group 22 to the tenth VNF group 21 is adopted, and the third VNF group 21 and the tenth VNF group 21 are defined as the terminatory VNF groups 21, for example. In this case, for each of the VNFs 12 located between the aggregation LB group 22 and the third VNF group 21, the management server 3 extracts auxiliary transfer paths addressed to the individual terminated VNFs 12 within the third VNF group 21 and registers the extracted auxiliary transfer paths in the auxiliary memory 52. As a result, the VNFs 12 on paths that are located between the aggregation LB group 22 and the third VNF group 21 and that are used for relaying traffics addressed to the terminated VNFs 12 within the third VNF group 21 are able to avoid traffic discarding caused by a time difference of a setting change, by using currently-operated and auxiliary transfers.

In addition, for each of the VNFs 12 located between the third VNF group 21 and the tenth VNF group 21, auxiliary transfer paths addressed to the individual terminated VNFs 12 within the tenth VNF group 21 are extracted, and the extracted auxiliary transfer paths are registered in the auxiliary memory 52. As a result, the VNFs 12 on paths that are located between the third VNF group 21 and the tenth VNF group 21 and that are used for relaying traffics addressed to the terminated VNFs 12 within the tenth VNF group 21 are able to avoid traffic discarding caused by a time difference of a setting change, by using currently-operated and auxiliary transfers.

While the service chain 20A of the above-mentioned embodiment adopts a configuration in which the aggregation LB group 22 is arranged in the first stage, the aggregation LB group 22 may be arranged backward in addition to the first stage, and an arbitrary change may be adopted.

In the embodiments, so as to equalize traffic amounts of the respective VNFs 12 located within the VNF groups 21 serving as load distribution targets within the service chain, traffic rates of the respective VNFs 12 and the allocation rates of the aggregation LBs 13A are calculated. However, there is no limitation to the VNFs 12 located within the VNF groups 21 serving as load distribution targets, and so as to equalize loads of all the VNFs 12 within the service chain, traffic rates of the respective VNFs 12 and the allocation rates of the aggregation LBs 13A may be calculated. In addition, while the management server 3 calculates traffic rates of the respective VNFs 12 after determining transfer paths of the individual VNFs 12, the transfer paths and the traffic rates of the individual VNFs 12 may be simultaneously calculated.

In addition, configuration items of each of illustrated units do not have to be physically configured as illustrated. In other words, specific states of the distribution or integration of the individual units are not limited to these illustrated in the drawings, and all or part of the individual units may be functionally or physically distributed or integrated in arbitrary units, depending on various loads, various usage situations, and so forth.

Furthermore, all or an arbitrary part of various processing functions performed by individual devices may be performed on a central processing unit (CPU), a digital signal processor (DSP), a field programmable gate array (FPGA), or the like. In addition, all or an arbitrary part of various processing functions may be performed on a program analyzed and executed by a CPU or the like or may be performed on hardware based on a hard-wired logic.

An area storing therein various kinds of information may be configured by a read only memory (ROM) or a random access memory (RAM) such as a synchronous dynamic random access memory (SDRAM), a magnetoresistive random access memory (MRAM), or a non-volatile random access memory (NVRAM), for example.

Figure 12:
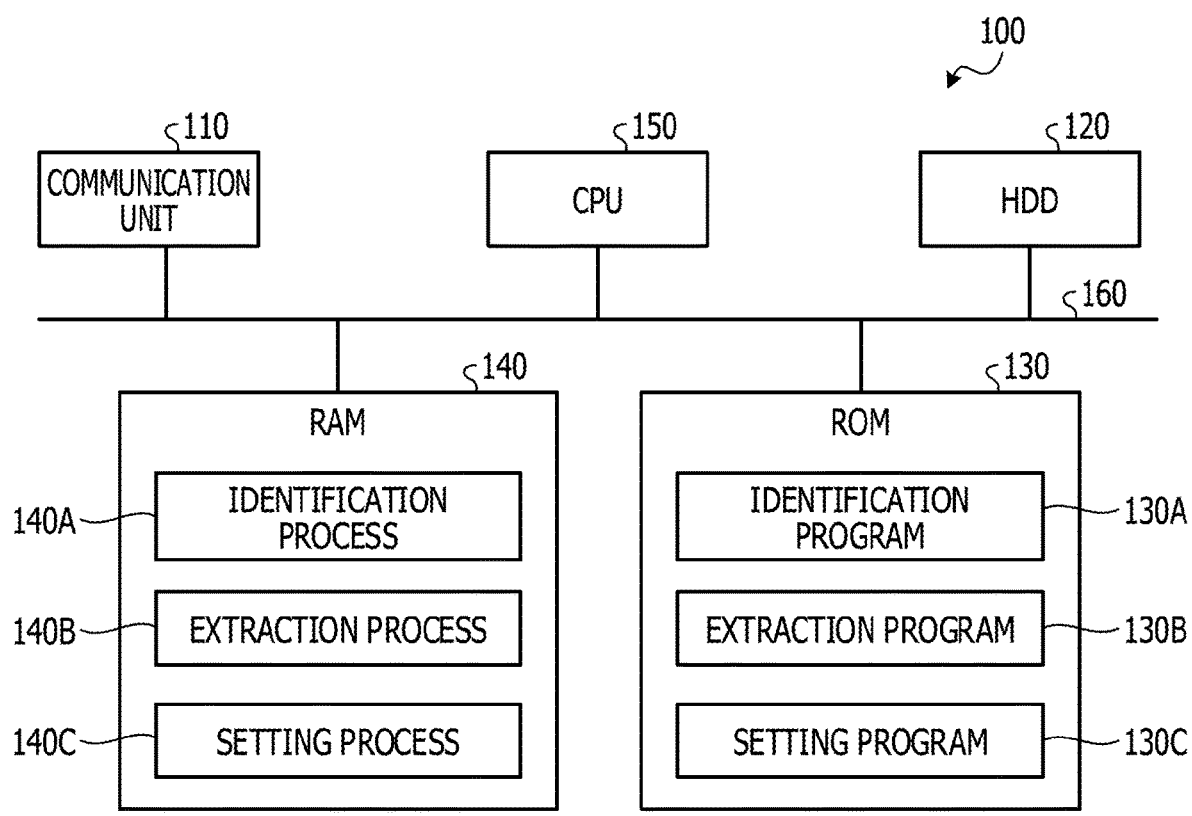
FIG. 12 is an explanatory diagram illustrating an example of an information processing device to execute a setting program.
Figure 13:
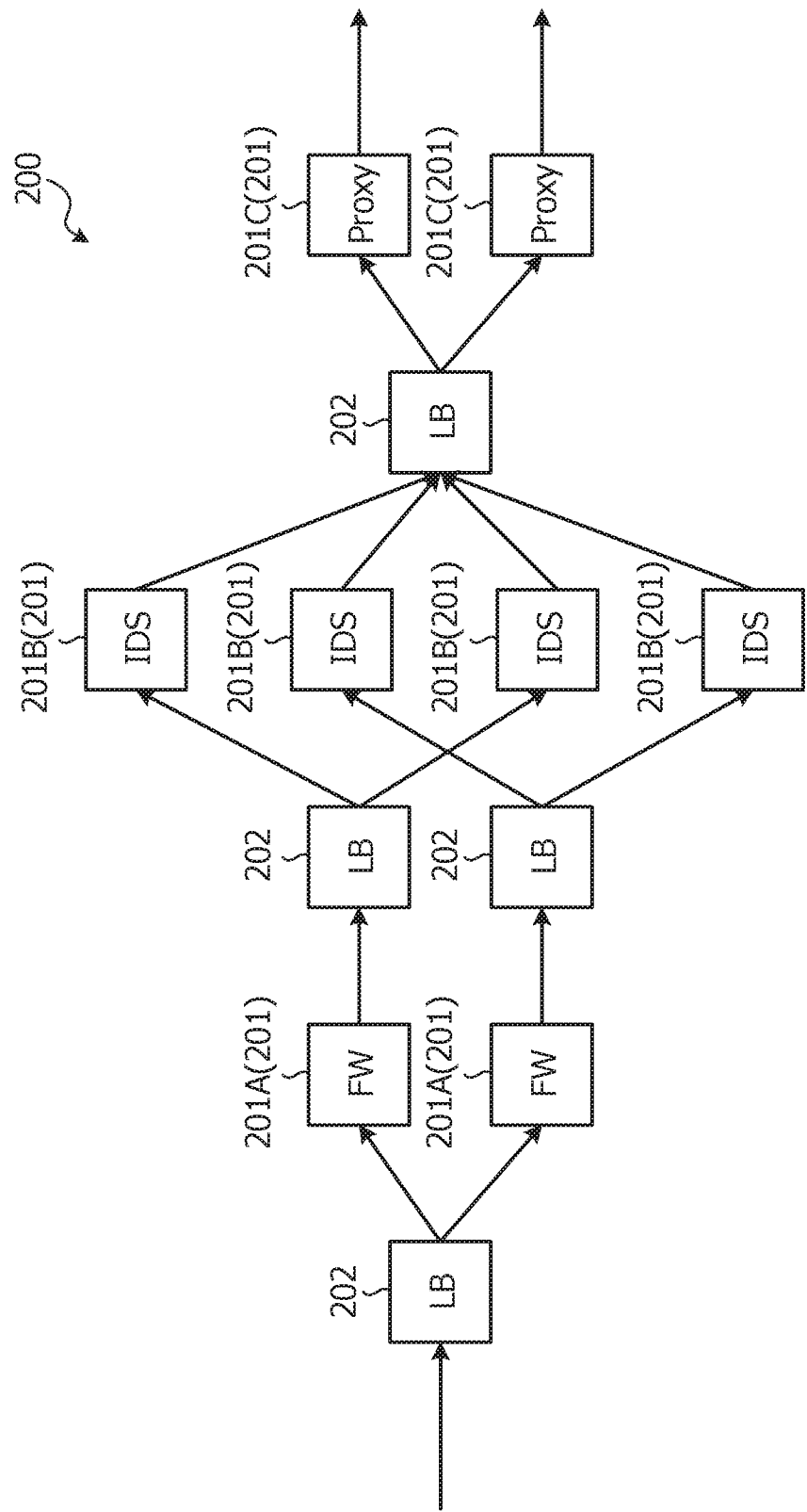
FIG. 13 is an explanatory diagram illustrating an example of an arrangement configuration of a service chain.

By the way, a preliminarily prepared program may be caused to be executed by a processor such as a CPU within a computer, thereby realizing various kinds of processing described in the present embodiments. Therefore, in what follows, there will be described an example of an information processing device 100 to execute a program including the same functions as those of the above-mentioned embodiments. FIG. 12 is an explanatory diagram illustrating an example of the information processing device 100 to execute a setting program.

The information processing device 100 that is to execute the setting program and that is illustrated in FIG. 12 includes a communication unit 110, a hard disc drive (HDD) 120, a ROM 130, a RAM 140, and a CPU 150. The communication unit 110, the HDD 120, the ROM 130, the RAM 140, and the CPU 150 are coupled to one another via a bus 160. The communication unit 110 is coupled to another information processing device not illustrated and communicates with the other information processing device. In addition, the information processing device 100 communicates with the other information processing device and arranges virtual communication function groups in stages on virtual areas within the other information processing device, thereby configuring a service chain.

In addition, in the ROM 130, a management program to fulfil the same functions as those of the above-mentioned embodiments is preliminarily stored. In the ROM 130, as setting programs, an identification program 130A, an extraction program 130B, and a setting program 130C are stored. Note that the management program may be recorded not in the ROM 130 but in a recording medium able to be read by a computer by using a drive not illustrated. In addition, as the recording medium, a portable recording medium such as a CD-ROM, a DVD disk, or a USB memory or a semiconductor memory such as a flash memory may be adopted, for example.

In addition, the CPU 150 reads the identification program 130A from the ROM 130, thereby causing the identification program 130A to function as an identification process 140A on the RAM 140. Furthermore, the CPU 150 reads the extraction program 130B from the ROM 130, thereby causing the extraction program 130B to function as an extraction process 140B on the RAM 140. Furthermore, the CPU 150 reads the setting program 130C from the ROM 130, thereby causing the setting program 130C to function as a setting process 140C on the RAM 140.

From among virtual machine groups that are arranged in stages and that realize communication functions, the CPU 150 identifies a termination type virtual machine to terminate traffics. For each of virtual machines that relay traffics to the termination type virtual machine, the CPU 150 extracts an auxiliary communication path including an output destination virtual machine to which a traffic addressed to the termination type virtual machine is output. For each of the virtual machines that relay traffics to the termination type virtual machine, the CPU 150 sets the extracted auxiliary communication path. As a result, it is possible to avoid traffic discarding of virtual communication functions, caused by a time difference before completion of a setting change of the service chain.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A setting method for a server apparatus comprising:
    identifying, from virtual machine groups arranged in plural stages that realize communication functions, all termination type virtual machines that terminate traffics;
    at a time of arranging the virtual machine groups in stages, determining a distribution type virtual machine that realizes a distribution function and that is arranged in a stage preceding a virtual machine group located in a first stage out of the stages;
    determining a communication path to be operated, based on a load between the distribution type virtual machine and each of all the termination type virtual machines;
    setting in the distribution type virtual machine and the individual virtual machines, arranged in the determined communication path to be operated;
    extracting, for each of relay virtual machines that relay traffics to each of all the termination type virtual machines, an auxiliary communication path including an output destination virtual machine to which a traffic addressed to each of all the termination type virtual machines is output; and
    setting, for each of the relay virtual machines, the extracted auxiliary communication path for each of all the termination type virtual machines in the virtual machine groups,
    wherein the auxiliary communication path is between virtual machines.

2. The setting method for a server apparatus according to claim 1, further comprising:
    extracting the auxiliary communication path for each of the relay virtual machines between the distribution type virtual machine and each of all the termination type virtual machines.

3. The setting method for a server apparatus according to claim 1, further comprising:
   after extracting the auxiliary communication path for each of the relay virtual machines, deleting the operated communication path out of the extracted auxiliary communication paths.

4. The setting method for a server apparatus according to claim 1, further comprising:
   in a case where a change in a configuration of the virtual machine group is detected, identifying all the termination type virtual machine from among the virtual machine groups.

5. A server apparatus comprising:
   a memory; and
   a processor coupled to the memory and configured to:
   identify, from virtual machine groups arranged in plural stages that realize communication functions, all termination type virtual machines that terminates traffics;
   at a time of arranging the virtual machine groups in stages, determine a distribution type virtual machine that realizes a distribution function and that is arranged in a stage preceding a virtual machine group located in a first stage out of the stages;
   determine a communication path to be operated, based on a load between the distribution type virtual machine and each of all the termination type virtual machines;
   set in the distribution type virtual machine and individual virtual machines, arranged in the determined communication path to be operated;
   extract, for each of relay virtual machines that relay traffics to each of all the termination type virtual machines, an auxiliary communication path including an output destination virtual machine to which a traffic addressed to each of all the termination type virtual machines is output; and
   set, for each of the relay virtual machines, the extracted auxiliary communication path for each of all the termination type virtual machines in the virtual machine groups,
   wherein the auxiliary communication path is between virtual machines.

* * * * *